(12) United States Patent
Takahashi et al.

(10) Patent No.: US 9,071,120 B2
(45) Date of Patent: Jun. 30, 2015

(54) LINEAR ACTUATOR AND BORING DEVICE

(75) Inventors: Kazuhiro Takahashi, Hyogo (JP); Daisuke Yamaguchi, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 577 days.

(21) Appl. No.: 13/484,375

(22) Filed: May 31, 2012

(65) Prior Publication Data

US 2013/0020104 A1    Jan. 24, 2013

(30) Foreign Application Priority Data

Jul. 19, 2011   (JP) .................................. 2011-158233
Jul. 19, 2011   (JP) .................................. 2011-158234

(51) Int. Cl.
| | | |
|---|---|---|
| B25D 11/00 | (2006.01) | |
| H02K 33/16 | (2006.01) | |
| B23B 41/04 | (2006.01) | |
| B23B 29/034 | (2006.01) | |
| B23Q 1/58 | (2006.01) | |
| B23Q 5/28 | (2006.01) | |

(52) U.S. Cl.
CPC ................ H02K 33/16 (2013.01); B23B 41/04 (2013.01); B23B 29/03457 (2013.01); B23Q 1/58 (2013.01); B23Q 5/28 (2013.01); *B23B 2260/0625* (2013.01)

(58) Field of Classification Search
CPC ....... B25D 11/00; B25D 11/06; B25D 11/064
USPC ........................................... 173/213, 90, 118
See application file for complete search history.

(56) References Cited

U.S. PATENT DOCUMENTS

| | | | | |
|---|---|---|---|---|
| 4,015,671 A | * | 4/1977 | Borisov et al. ................ | 173/117 |
| 4,165,800 A | * | 8/1979 | Doherty et al. ................ | 185/39 |
| 4,237,987 A | * | 12/1980 | Sherman ....................... | 173/117 |
| 4,508,476 A | | 4/1985 | Kalokhe | |
| 4,515,303 A | * | 5/1985 | Schadlich et al. ............ | 227/131 |
| 4,646,595 A | | 3/1987 | Slee | |
| 4,721,169 A | * | 1/1988 | Nagasawa et al. ............ | 173/178 |
| 5,236,053 A | * | 8/1993 | Butsch .......................... | 173/176 |
| 5,497,555 A | * | 3/1996 | Averbukh ....................... | 30/362 |
| 6,520,269 B2 | * | 2/2003 | Geiger et al. ................. | 173/117 |
| 6,662,990 B1 | * | 12/2003 | Sun .............................. | 227/131 |
| 6,918,449 B2 | * | 7/2005 | Shinagawa et al. ........... | 173/2 |
| 7,025,183 B2 | * | 4/2006 | Steffen et al. ................ | 188/267 |

(Continued)

FOREIGN PATENT DOCUMENTS

| | | |
|---|---|---|
| JP | 6085846 A | 5/1985 |
| JP | H11-179605 A | 7/1999 |

(Continued)

*Primary Examiner* — Gloria R Weeks
(74) *Attorney, Agent, or Firm* — Posz Law Group, PLC

(57) ABSTRACT

A linear actuator having a linearly extending slider disposed in a body casing, a plurality of magnets fixed to the slider along the axial direction of the slider, and a plurality of coils supported by the body casing so as to surround the slider to which the magnets are fixed, the linear actuator being structured so that a slider shifts in the axial direction relative to the body casing due to interaction between energized coils and magnets, the linear actuator further comprising a plurality of flat springs each supporting one end or the other end of the slider in the axial direction, each flat spring being elastically deformed relative to the axial direction of the slider.

4 Claims, 19 Drawing Sheets

(56) References Cited

U.S. PATENT DOCUMENTS 7,063,173 B2 * 6/2006 Herla ............................ 173/216
2010/0206593 A1 * 8/2010 Schad et al. .................. 173/128

FOREIGN PATENT DOCUMENTS

| JP | 2007-089382 A | 4/2007 |
| JP | A-2011-173214 | 9/2011 |

* cited by examiner (a)

(b)

LINEAR ACTUATOR AND BORING DEVICE

CROSS REFERENCE TO RELATED APPLICATIONS

This application is based on and claims priority to Japanese Patent Applications No. 2011-158233 filed on Jul. 19, 2011 and No. 2011-158234 filed on Jul. 19, 2011, the disclosures of which are incorporated herein by reference.

TECHNICAL FIELD TO WHICH THE INVENTION PERTAINS

The present invention relates to a linear actuator that pushes or pulls an object, and a boring device equipped with a linear actuator.

PRIOR ART

The structure shown in FIG. 9 is conventionally known as a typical structure for a linear actuator (Patent Literature 1). As illustrated in FIG. 9, a linear actuator 100 comprises, in a body casing 101, a linearly extending slider 102, a plurality of magnets 103 fixed to the slider 102, and a plurality of coils 104 supported by the body casing 101 in such a manner as to surround the slider 102 to which the magnets 103 are fixed. The linear actuator 100 further comprises a pair of bearings 105 each of which holds one or the other end of the slider 102 in the axial direction. In the linear actuator 100 having such a structure, when a current is applied to the coils 104, due to the interaction between the electrically energized coils 104 and magnets 103, the slider 102 shifts relative to the body casing 101 in the axial direction. As a result, an object connected to the slider 102 can be pushed or pulled by the slider 102 that was shifted in the axial direction.

CITATION LIST

Patent Literature

PTL 1: Japanese Unexamined Patent Publication No. 2007-89382
PTL 2: Japanese Unexamined Patent Publication No. H11-179605

SUMMARY OF INVENTION

Technical Problem

However, in the linear actuator 100 described above, although the slider 102 is held by the bearings 105, when the slider 102 shifts in the axial direction, backlash or runout is sometimes observed in the slider 102 during shifting. This may adversely affect accuracy when the slider 102 pushes or pulls an object.

The present invention was made to solve the above problem, and aims to provide a linear actuator that allows an object to be pushed or pulled in an accurate manner, and a boring device provided with the linear actuator.

Also, various boring devices have been proposed over the years; however, recently there is a demand for boring not only to form the usual circular borehole but also to form a noncircular borehole. For example, the boring device of Patent Literature 2 has a structure wherein a tool that is provided on the tip of a tool holder extending in a rod-like shape is extruded in the radial direction using a piezoelectric element. Here, a noncircular borehole is formed by rotating the tool holder about the axis while adjusting the protrusion length of the tool using the piezoelectric element.

The Applicant previously developed a boring device as shown in FIGS. 18 and 19 (see JP 2010-039047). The boring device 300 comprises a hollow main shaft 302, and a table 303 that supports the main shaft 302 rotatably about a predetermined axis line 310. The boring device 300 further comprises a tool holder 301 that extends into a rod-like shape and rotates coaxially with the main shaft 302, a tool 311 that is provided on the tip portion of the tool holder 301 and extrudes in the radial direction, and a tilting unit 304 that is arranged across the main shaft 302 and the tool holder 301 and tilts the tool holder 301 relative to the axis line 310. The boring device 300 comprises a draw bar 307 reciprocable along the axis line 310 in the main shaft 302, a first driving means (not shown) for rotating the main shaft 302 about the axis line 310, and a second driving means (not shown) for reciprocating the draw bar 307 along the axis line 310.

The tilting unit 304 comprises a base 342 that is coupled between the draw bar 307 and the tool holder 301 in the axis line 310 direction and arranged having a gap with one end portion of the main shaft 302; a fixing member 344 fixed at one end portion of the main shaft 302 at a location apart from the axis line 310 in the radial direction; and a coupling member 343 for coupling the base 342 with the fixing member 344 in the radial direction. At least one of the fixing member 344 and the coupling member 343 is configured to be elastically deformable.

In this structure, when the main shaft 302 is rotated by the first driving means, the tool holder 301 rotates in accordance with the rotation of the main shaft 302, and the tool 311 provided on the tip of the tool holder 301 bores a workpiece w. Furthermore, when the draw bar 307 is reciprocated by the second driving means while rotating the tool holder 301, the base 342 is reciprocated accordingly. Here, the coupling member 343 supports the base 342 while being elastically deformed. When the base 342 is reciprocated, the tool holder 301 tilts. This allows the boring diameter to be changed so that a noncircular borehole can be formed.

However, in the structure shown in FIGS. 18 and 19, the boring is repeated many times over a long time period, and the base 342 reciprocates each time and the coupling member 343 is elastically deformed. This gradually weakens the restoring force of the coupling member 343, and the base 342 may not be able to return to the original position. As a result, the location of the base 342 shifts from the original position, and this makes it difficult to maintain a certain level of processing accuracy. In particular, when the tilting unit 304 is lightened, the amount of the shift may become larger and the rotation of the tool holder 301 may be imbalanced. Therefore, there was room for improvement in this respect.

An object of the present invention is to solve the above problem and to provide a boring device that can repeatedly bore with a uniform quality.

Solution to Problem

The present invention provides a linear actuator that solves the above problem. More specifically, the linear actuator comprises a slider provided in the body casing with linearly extending therein, at least one magnet fixed to the slider along the axial direction of the slider, and at least one coil supported by the body casing so as to surround the slider to which said at least one magnet is fixed, wherein the slider shifts relative to the body casing in the axial direction due to the interaction between the energized one or more coils and one or more magnets. The linear actuator further comprises a plurality of elastic members, each of the elastic members supports one or the other end portion of the slider in the axial direction, and the elastic members elastically deform due to the shift of the slider in the axial direction.

In this structure, the slider is supported by the elastic members, and when the slider slides in the axial direction, the elastic members keep supporting the slider by elastically deforming. Because the slider shifts while being elastically supported, the slider can be stabilized even while shifting. This arrangement can suppress the backlash and/or runout of the slider; therefore, the object connected to the slider can be precisely pushed or pulled.

Furthermore, in the linear actuator, the elastic member is composed of a plurality of flat springs, and the plurality of flat springs comprise at least one front flat spring that supports the front end portion of the slider in the axial direction and at least one rear flat spring that supports the rear end portion thereof in the axial direction, wherein the sum of the stiffness of said at least one front flat spring is preferably greater than that of said at least one rear flat spring.

The present invention also provides a boring device that can solve the above problem. More specifically the boring device comprises a rotatable main shaft having a hollow portion along the axial direction; a main shaft driving means for rotating the main shaft about the axis line; a tool holder that is connected to one end portion of the main shaft, that is capable of rotating with the main shaft, and that is capable of tilting relative to the axis line; a tool supported by the tool holder; a draw bar inserted in the hollow portion so as to be slidable in the direction along the axis line of the main shaft, wherein the draw bar is connected to the tool holder and tilts the tool holder by sliding; and a draw bar driving means for sliding the draw bar in the direction along the axis line. In this structure, the draw bar driving means may comprise any one of the linear actuator mentioned above, and the draw bar may be connected to the slider.

The present invention further provides another boring device that can solve the above problem. More specifically, the boring device comprises a rotatable main shaft having a hollow portion along the axis line direction; a main shaft driving means for rotating the main shaft about the axis line; a tool holder that is connected to one end portion of the main shaft via a tilting unit and that is rotatable with the main shaft; a tool supported by the tool holder; a draw bar inserted in the hollow portion so as to be slidable along the axis line of the main shaft; and a draw bar driving means for sliding the draw bar in the direction along the axis line. The tilting unit comprises a fixing member that is fixed to one end portion of the main shaft at a location apart from the axis line of the main shaft; a base fixed to the tool holder; and a coupling member that connects the fixing member with the base in an integral manner and that elastically deforms when the base departs from or approaches the main shaft, wherein the tip of the draw bar is capable of being in contact with the base so as to push the base, and a balancing member is fixed to the base in the position opposite to the fixing member.

In this structure, even though the base is pushed by the draw bar, because the balancing member is fixed to the base, the base can reliably return to the original position due to the weight of the balancing member when the pressing of the base is released. Therefore, having this structure makes it possible to keep the tilting unit at the original position and maintain its quality. As a result, boring can be repeated with a uniform quality.

Advantageous Effects of Invention

The linear actuator of the present invention makes it possible to perform pushing or pulling of an object in a precise manner.

Furthermore, the boring device of the present invention allows boring to be repeated with a uniform quality.

DESCRIPTION OF EMBODIMENTS

Figure 1:
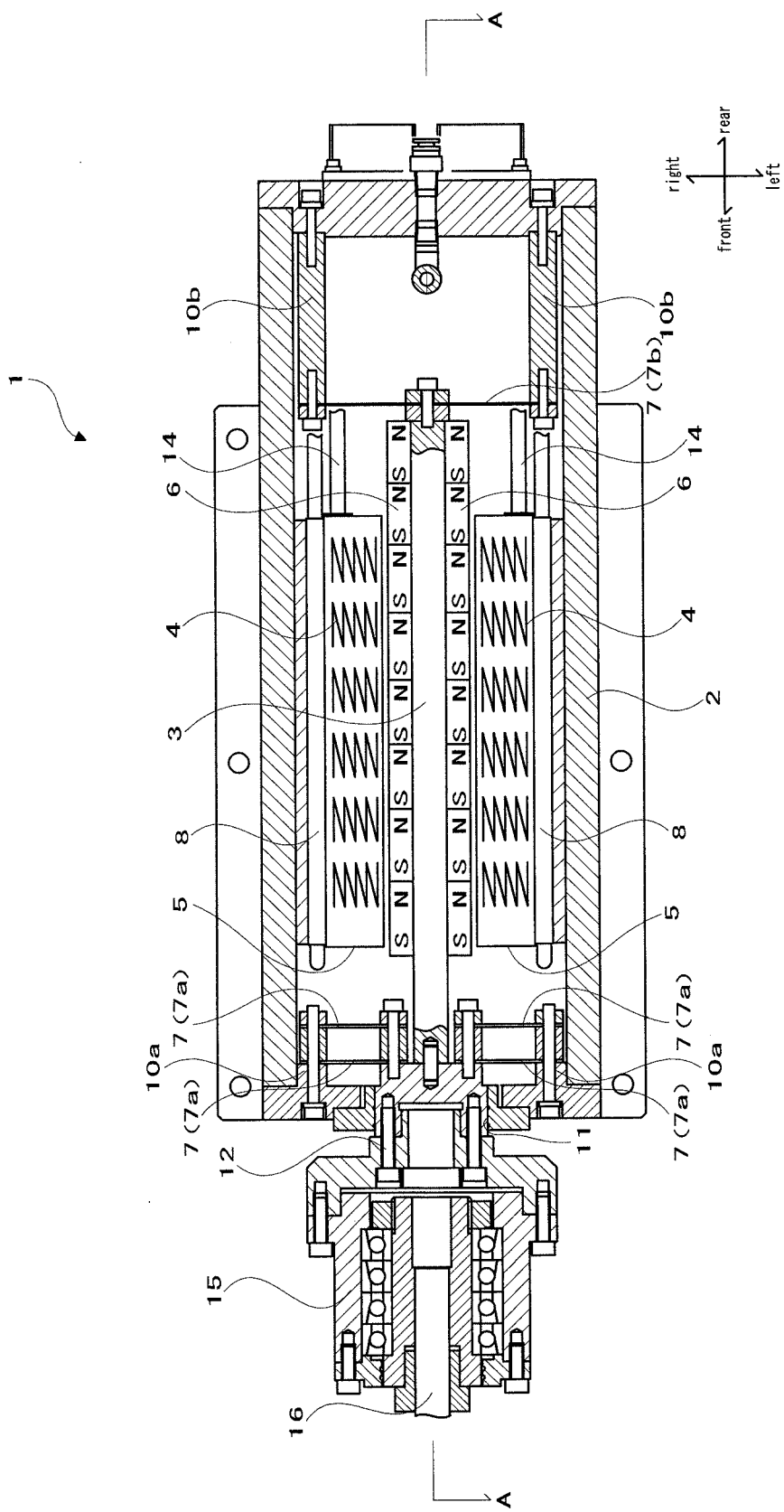
FIG. 1 is a cross-sectional view of the linear actuator according to one embodiment of the present invention.
Figure 2:
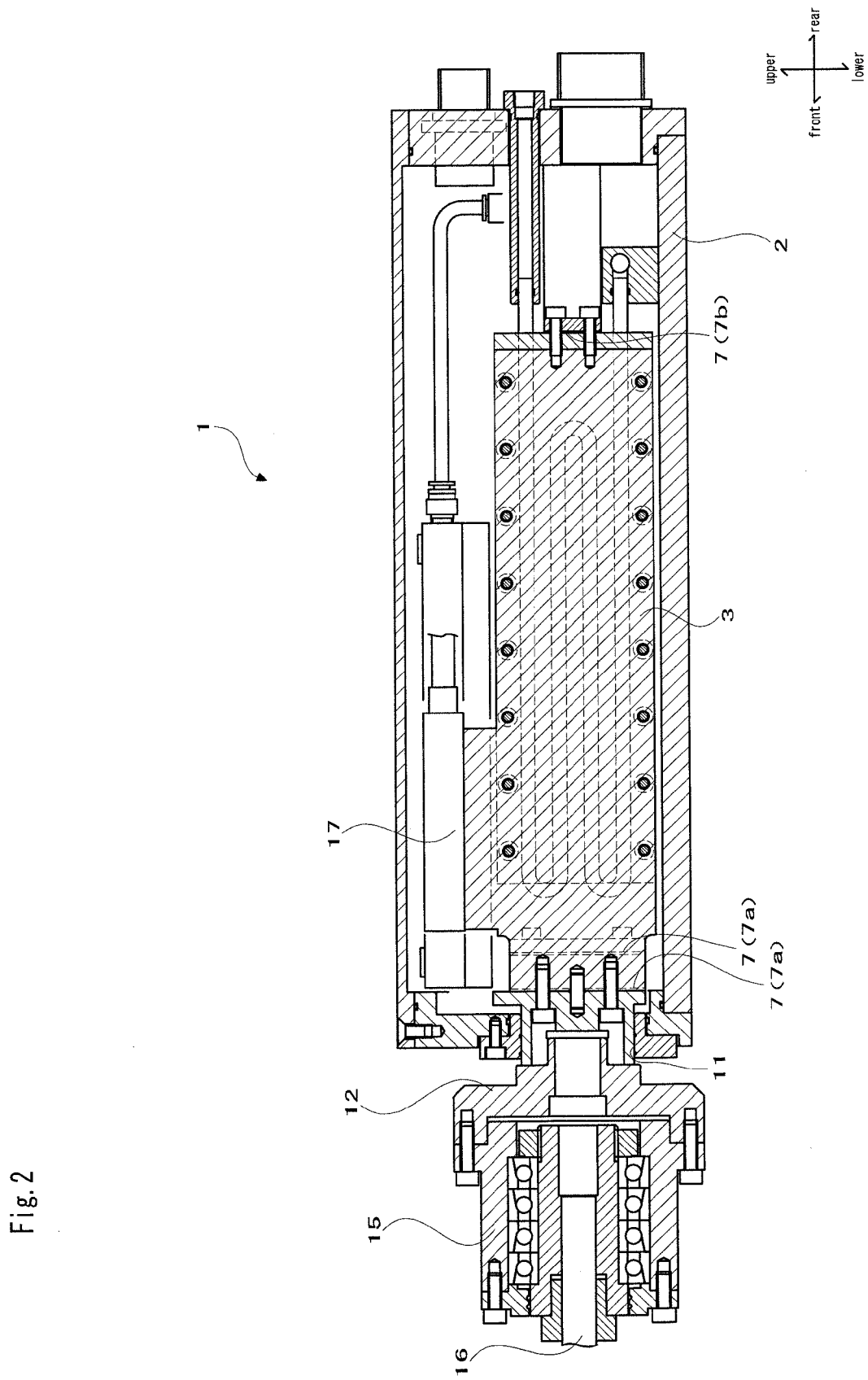
FIG. 2 is a cross-sectional view of FIG. 1 along line A-A.
Figure 3:
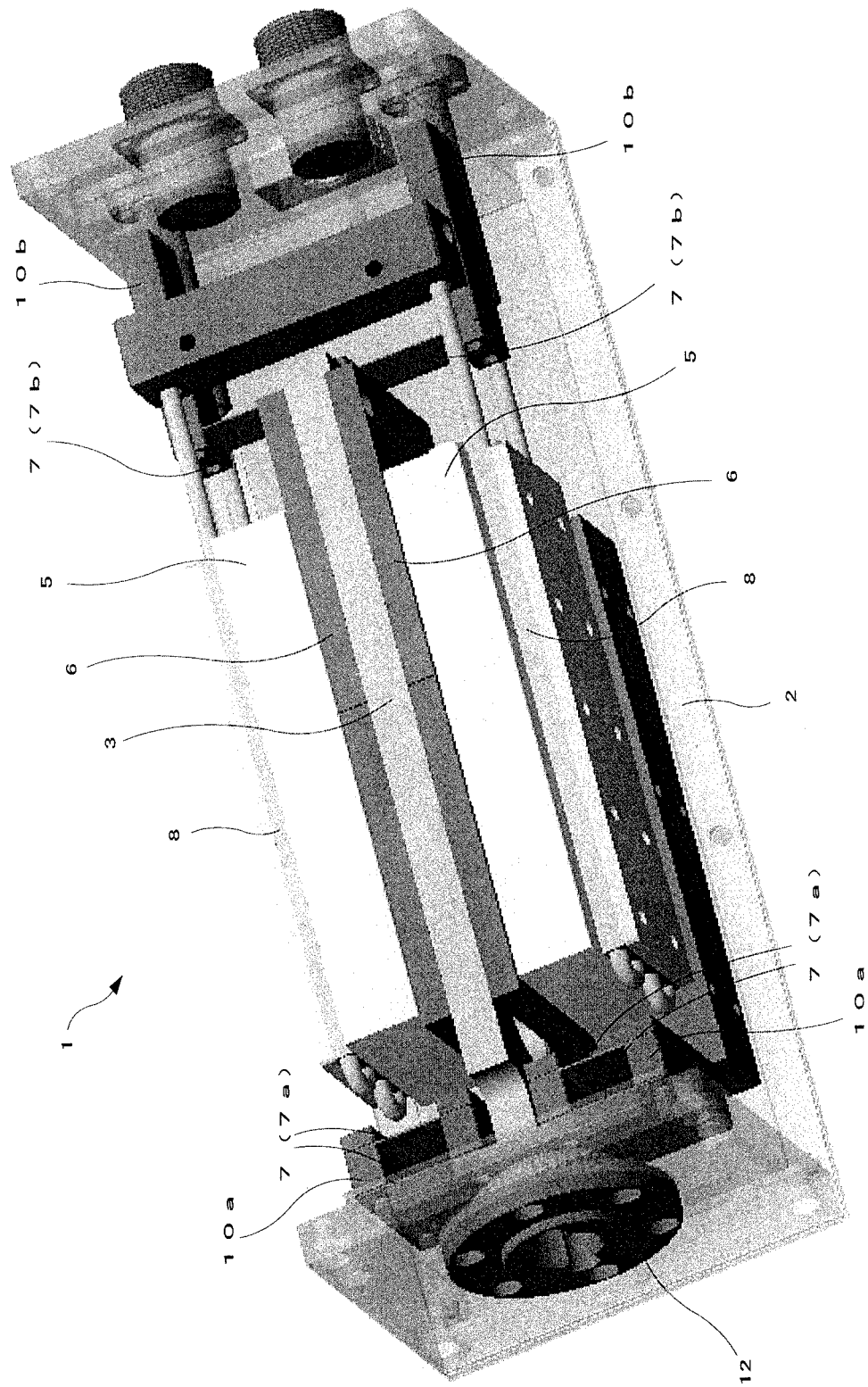
FIG. 3 is a perspective view illustrating the inside of the linear actuator.

The present invention is explained in detail below with reference to the drawings. FIG. 1 is a cross-sectional view of the linear actuator according to one embodiment of the present invention. FIG. 2 is a sectional view of FIG. 1 along line A-A. FIG. 3 is a perspective view showing the inside of the linear actuator. Note that, in the following explanation, the left side in FIGS. 1 and 2 is defined as the "front side or anterior direction" and the right side is defined as the "rear side or posterior direction."

As shown in FIGS. 1 to 3, a linear actuator 1 comprises a horizontally arranged body casing 2, a plate-like slider 3 disposed inside the body casing 2, and a plurality of magnets 6,6 . . . fixed to the right and left sides of the slider 3 (top and bottom surfaces of the slider 3 in FIG. 1). The linear actuator 1 further comprises a pair of coil cases 5,5 each disposed either on the left or right side of the slider 3 (above or below the slider 3 in FIG. 1) arranged so as to surround the slider 3 to which the magnets 6 are fixed, and a plurality of coils 4,4 . . . disposed in each of the coil cases 5. The linear actuator 1 further comprises a plurality of elastic members that support either the front end portion or the rear end portion of the slider 3. In this embodiment, flat springs 7,7 . . . are used as the elastic members.

The structure of the body casing 2 is not particularly limited as long as it can store the aforementioned slider 3, flat springs 7, coil cases 5 and the like therein. In this embodiment, the body casing 2 is formed into a rectangular shape combining a plurality of metal plates. Furthermore, an opening 11 is formed in the front wall of the body casing 2.

A plurality of front fixing members 10a and rear fixing members 10b for fixing the flat springs 7 are provided to the front wall and rear wall of the body casing 2, respectively, in such a manner that they protrude toward the inside of the body casing 2. The front fixing members 10a and the rear fixing members 10b are fixed to the body casing 2 in the left and right sides of the slider 3 (above and below the slider 3 in FIG. 1) and extend in the direction parallel to the axis of the slider 3. The method for fixing the front fixing members 10a and the rear fixing members 10b is not particularly limited, and they may be fixed to the body casing 2, for example, by using a bolt or by welding.

The slider 3 is formed from a metal plate-like member, and linearly extends in the anteroposterior direction (the lateral direction in the figure). Furthermore, the slider 3 is disposed in the central portion of the body casing 2, and arranged so as to be reciprocable back and forth in the body casing 2. The slider 3 extends toward the opening 11 in the body casing 2, and a coupling member 12 for connecting the driven members is fixed to the front end portion of the slider 3. The method for fixing the coupling member 12 is not particularly limited, and fixing may be performed using a bolt or by welding.

The coupling member 12 is inserted in the opening 11 with a slight gap therebetween, and the coupling member 12 is arranged so that it can reciprocate in the anteroposterior direction (the lateral direction in the figure) in the opening 11. The coupling member 12 is formed from an angled metal member, and a bearing 15 is fixed to the front end portion thereof. A draw bar 16 of the boring device described below is rotatably fixed to the bearing 15 as the driven member; therefore, the reciprocation of the coupling member 12 can be transferred to the draw bar 16. This allows the reciprocating movement of the slider 3 of the linear actuator 1 to be transferred to the draw bar 16 of the boring device via the coupling member 12 and the bearing 15.

The plurality of magnets 6 fixed to the left and right sides of the slider 3 are aligned along the axial direction (in the anteroposterior direction) of the slider 3. The plurality of magnets 6 are arranged so as to sandwich the slider 3 between the right-row of magnets 6 and left-row of magnets 6. Each magnet 6 is disposed in such a manner that its magnetizing direction is in parallel to the axial direction of the slider 3, so that the same poles are oriented to the same directions. In the present embodiment, the S poles of magnets 6 face forward and the N poles thereof face backward.

Each of the coil cases 5 around the slider 3 is formed of plastic and has a hollow box-like shape in which coils 4 are stored. The coil case 5 is fixed to a body casing 2 via a water jacket 8 located across the coil case 5 and the body casing 2. This arrangement allows the coil case 5 to be supported by the body casing 2. Here, the coil case 5 is disposed to face the magnets 6 having a gap therebetween. The linear actuator of the present embodiment is structured so that the slider 3 having magnets 6 fixed thereto can slide back and forth between a pair of coil cases 5.

Each coil 4 in the coil case 5 is formed by winding a conducting wire spirally, connected to a power source (not shown) via an electrifying line 14, and can generate a magnetic field by applying electric current. Application of electric current to the coils 4 can be controlled by a controller (not shown). The plurality of coils 4 are disposed having a gap therebetween, and arranged so that their axial direction intersects perpendicular to the magnetizing direction (the axial direction of the slider 3) of the magnets 6. In the present embodiment, the coils 4 are arranged so that their axial direction is horizontal. The plurality of coils 4 are disposed in right and left sides of the magnets 6 so as to surround the slider 3 having magnets 6 fixed thereto. Due to the interaction between the magnetic force generated by the coils 4 upon application of electric current and the magnetic force of the magnets 6, the magnets 6 shift in the axial direction (magnetizing direction), and the slider 3 accordingly shifts in the axial direction. The slider 3 is designed so as to shift relative to the body casing 2 attributable to the relative displacement between the coils 4 and the magnets 6 due to the interaction of magnetic forces thereof. Here, the winding direction of the coils 4 may be suitably selected so that the slider 3 shifts in the axial direction. In the present embodiment, the coils 4 are arranged in such a manner that the winding directions of each two adjacent coils 4 are opposite to each other.

Each water jacket 8 is fixed to the body casing 2 and the coil case 5 so as to connect them. The method for fixing the water jacket 8 is not particularly limited, and the water jacket 8 may be fixed using a bolt, by welding or via a clamping plate. A liquid coolant is flown into the water jacket 8. Therefore, the coils 4 disposed in the coil case 5 fixed to the water jacket 8 can be cooled by the cooling effect of such a liquid coolant.

The flat spring 7 for supporting the slider 3 is formed from a thin metal plate such as spring steel, which is elastically deformable and whose stiffness may be suitably selected. Furthermore, each of the plurality of flat springs 7 is arranged so as to intersect perpendicular to the slider 3 when the slider 3 is in the neutral position (i.e., when the slider 3 is not shifted in the anteroposterior direction). Furthermore, the plurality of flat springs 7 can be divided into two groups, namely, a front flat spring 7a that is fixed to a front fixing member 10a and a rear flat spring 7b that is fixed to a rear fixing member 10b. In the present embodiment, the plurality of flat springs 7 are composed of four front flat springs 7a and one rear flat spring 7b.

Two each of the front flat springs 7a are disposed on the right and left sides of the slider 3. Each front flat spring 7a is fixed to the front fixing member 10a and the coupling member 12 using a bolt and nut; therefore, it is connected to the body casing 2 and the front end portion of the slider 3 via the front fixing member 10a and the coupling member 12. The front flat spring 7a is thereby fixed to the body casing 2 and, at the same time, supports the front end portion of the slider 3. The method for fixing the front flat spring 7a is not particularly limited, and fixing may be performed by welding or the like.

The rear flat spring 7b is fixed to the rear fixing member 10b at its right and left end portions, and fixed to the rear end portion of the slider 3 at the central portion thereof. In the present embodiment, the rear flat spring 7b is fixed to the rear fixing member 10b and the slider 3 using a bolt and nut; however, the fixing method thereof is not particularly limited, and it may be fixed by welding or the like. The rear flat spring 7b is thereby fixed to the body casing 2 and, at the same time, supports the rear end portion of the slider 3.

The spring stiffness of the front flat spring 7a and that of the rear flat spring 7b are not particularly limited; however, it is preferable that the spring stiffness of the front flat spring 7a be greater than that of the rear flat spring 7b. It is also preferable that the sum of the stiffness of the front flat springs 7a be greater than that of the rear flat spring 7b. In the present embodiment, the sum of stiffness of the four front flat springs 7a is greater than the stiffness of one rear flat spring 7b.

In the body casing 2, a linear encoder 17 is disposed in adjacent to the slider 3, and the linear encoder 17 detects the amount of shift of the slider 3 in the axial direction. Depending on the shift amount detected by the linear encoder 17, the amount of current to be applied to the coils 4 is controlled by a controller (not shown).

Figure 4:
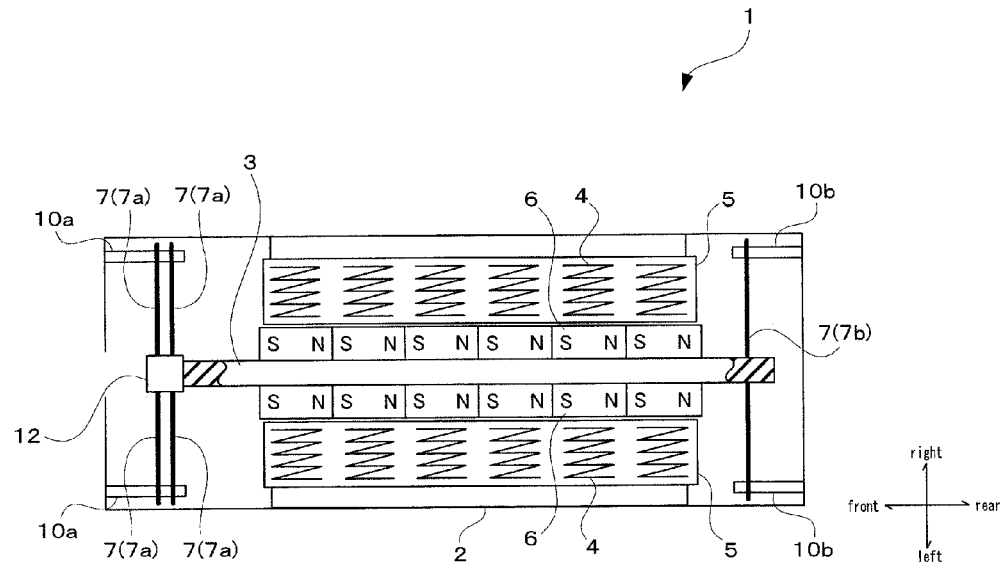
FIG. 4 schematically shows the operation of the linear actuator.
Figure 4:
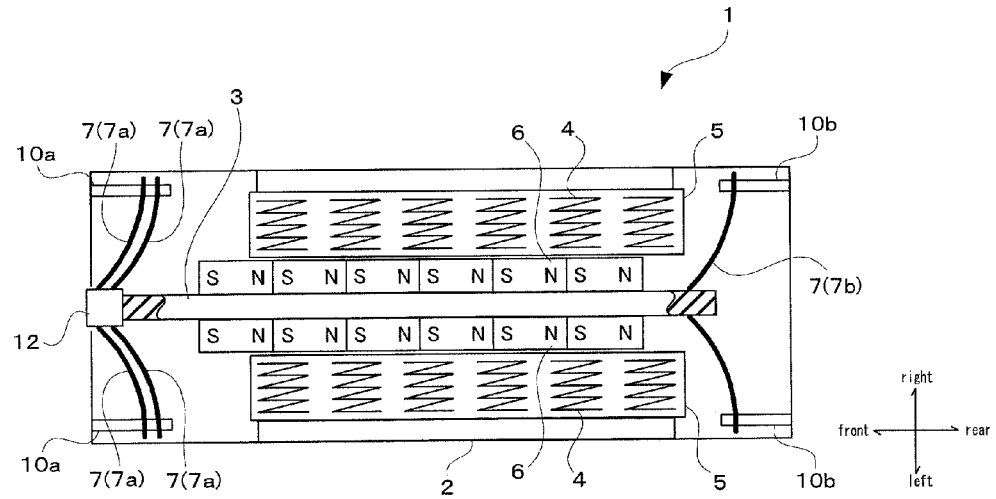

The operation of the linear actuator 1 having the structure described above is explained below. FIG. 4 schematically illustrates the operation of the linear actuator.

First, when electric current is supplied from a power source (not shown) to a plurality of coils 4, a magnetic field is generated around each of the coils 4. When a magnetic field is generated around the coil 4, due to the interaction between the magnetic force attributable to the magnetic field thus generated and the magnetic force of the magnet 6, a force is applied to the magnets 6 that moves the magnets 6 forward (toward the left side in the figure). This makes the slider 3 having magnets 6 fixed thereto shift forward in the axial direction (toward the left side in the figure) as shown in FIGS. 4(a) and 4(b). Due to the shift of the slider 3, the draw bar 16 that is connected to the slider 3 via the coupling member 12 located forward of the slider 3 can be pushed in the axial direction. When the draw bar 16 is to be pulled, by applying current to the coils 4 in the opposite direction, the slider 3 can be shifted backward in the axial direction (toward the right side in the figure).

When the slider 3 shifts forward or backward in the axial direction, a force shifting the slider 3 in the axial direction is accordingly applied to the front flat springs 7a and the rear flat spring 7b connected to the slider 3. This allows the front flat springs 7a and the rear flat spring 7b to elastically deform. Therefore, even under the condition wherein the slider 3 is shifted, the front flat springs 7a and the rear flat spring 7b elastically deform to support the slider 3.

In the linear actuator having the above structure, the slider 3 is supported by the flat springs 7, and when the slider 3 slides in the axial direction, the flat springs 7 support the slider 3 while accordingly elastically deforming; therefore, the slider 3 can be stabilized even while shifting. This arrangement can suppress backlash and/or runout of the slider 3, and allows the draw bar 16 connected to the slider 3 to be pushed or pulled precisely.

In the present embodiment, the amount of shift of the slider 3 is detected by a linear encoder 17, and a controller (not shown) controls the amount of electric current applied to the coils 4 depending on the detected amount of shift; therefore, the amount of shift of the slider 3 can be suitably controlled. Furthermore, the overheating of coils 4 can be prevented by cooling the coils 4 using the water jacket 8.

One embodiment of the present invention is explained above, but the specific embodiments of the present invention are not limited to the present embodiment.

For example, in the present embodiment, the coils 4 are disposed in the coil case 5. However, there is no limitation to the method for supporting the coils 4, and the coils 4 may be supported by a separate bearing member fixed to the body casing 2. Such a structure also allows the coils 4 to be supported and the slider 3 to slide due to the interaction between the coils 4 and magnets 6.

Furthermore, in the present embodiment, the front flat springs 7a indirectly support the slider 3 by being fixed to the coupling member 12; however, its structure is not particularly limited as long as it can support the slider 3, and the front flat springs 7a may be directly fixed to the slider 3. In the present embodiment, the flat springs 7 (i.e., the front flat springs 7a and the rear flat spring 7b) are fixed to the body casing 2 via the front fixing members 10a or the rear fixing members 10b; however, the front fixing members 10a and the rear fixing members 10b may be omitted to fix the flat springs 7 directly to the body casing 2.

The slider 3 in the present embodiment has a plate-like shape; however, the structure thereof is not particularly limited, and may be formed into various shapes, such as cylindrical.

The positional relationship between the coils 4 and the magnets 6 is not limited to that of the present embodiment, and may be suitably arranged as long as the coils 4 surround the slider 3 having magnets 6 fixed thereto, and the slider 3 can shift in the axial direction due to the interaction between the coils 4 and the magnets 6. For example, the magnets 6 are positioned only on the right and left surfaces of the slider 3 in the present embodiment; however, the magnets 6 may also be disposed on the top and bottom surfaces of the slider 3. Accordingly, the coils 4 may also be disposed to face the magnets 6 located on the top and bottom surfaces of the slider 3. Furthermore, the positional relationship between the coils 4 and the magnets 6 may be suitably selected among those used in publicly known linear actuators.

In the present embodiment, the draw bar 16 is pushed or pulled by the slider 3; however, the object to be pushed or pulled is not limited thereto and may be suitably selected.

Figure 5:
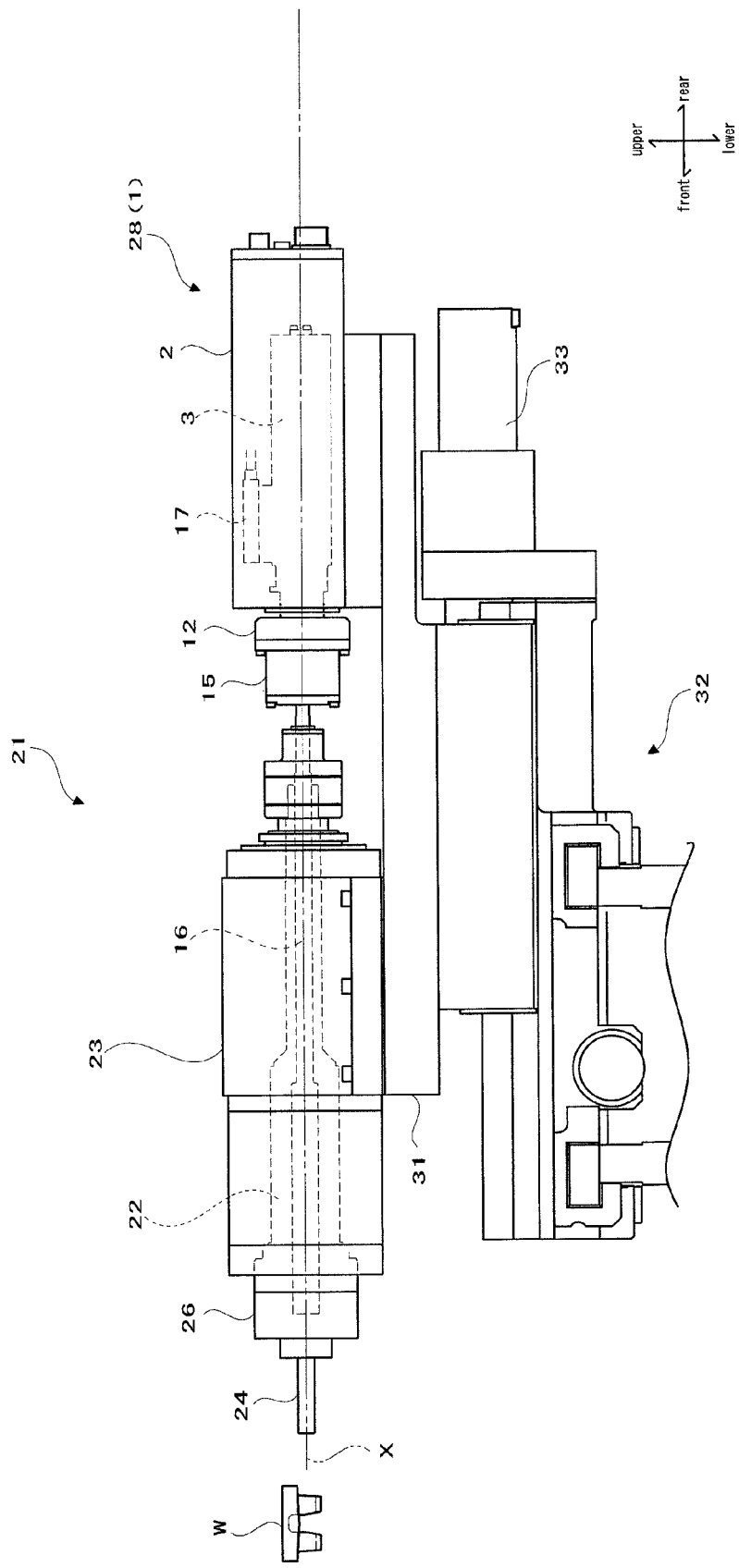
FIG. 5 is a longitudinal cross-sectional view of the boring device according to one embodiment of the present invention.
Figure 6:
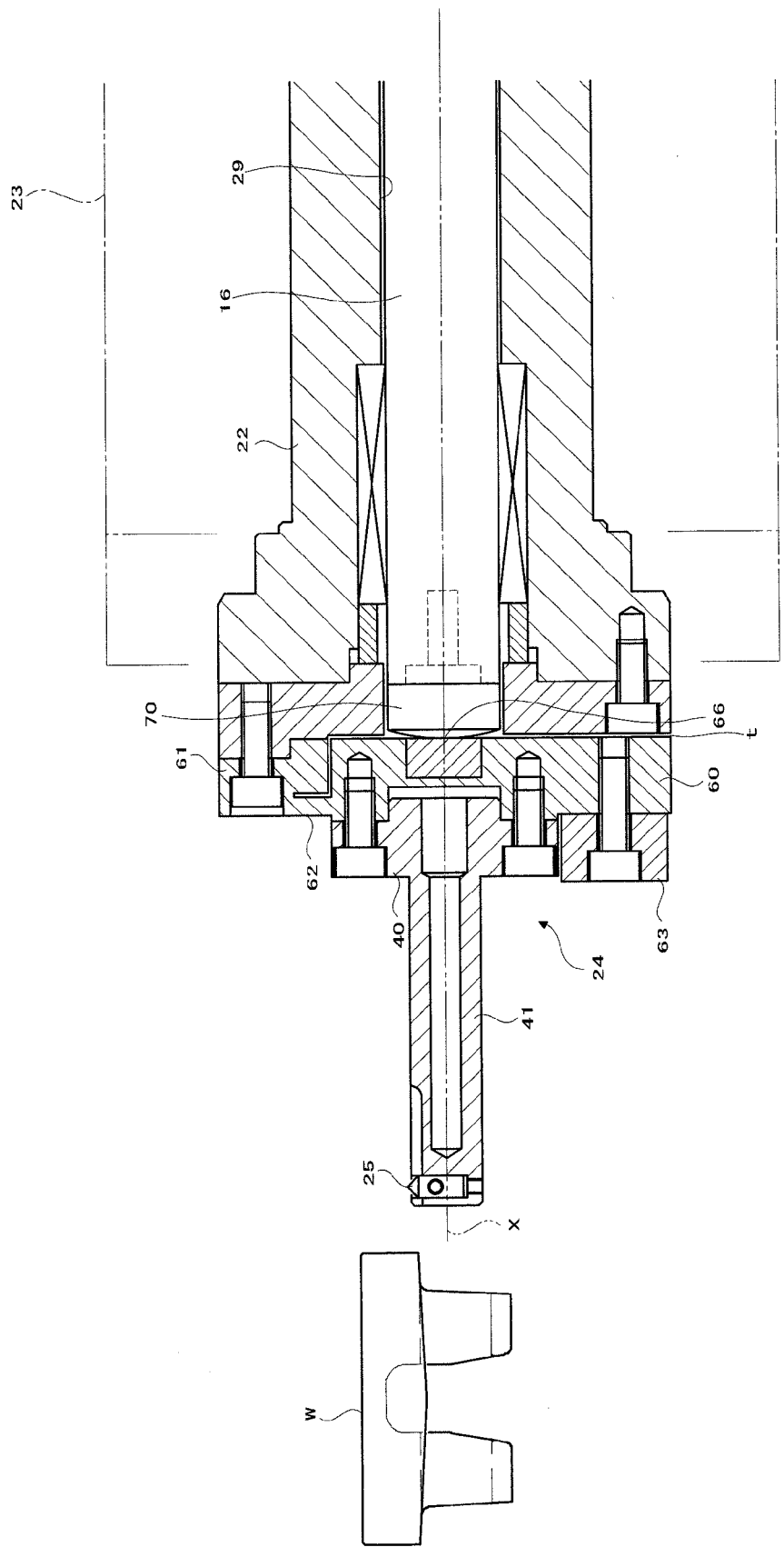
FIG. 6 is a cross-sectional view showing the principal parts of the boring device.
Figure 7:
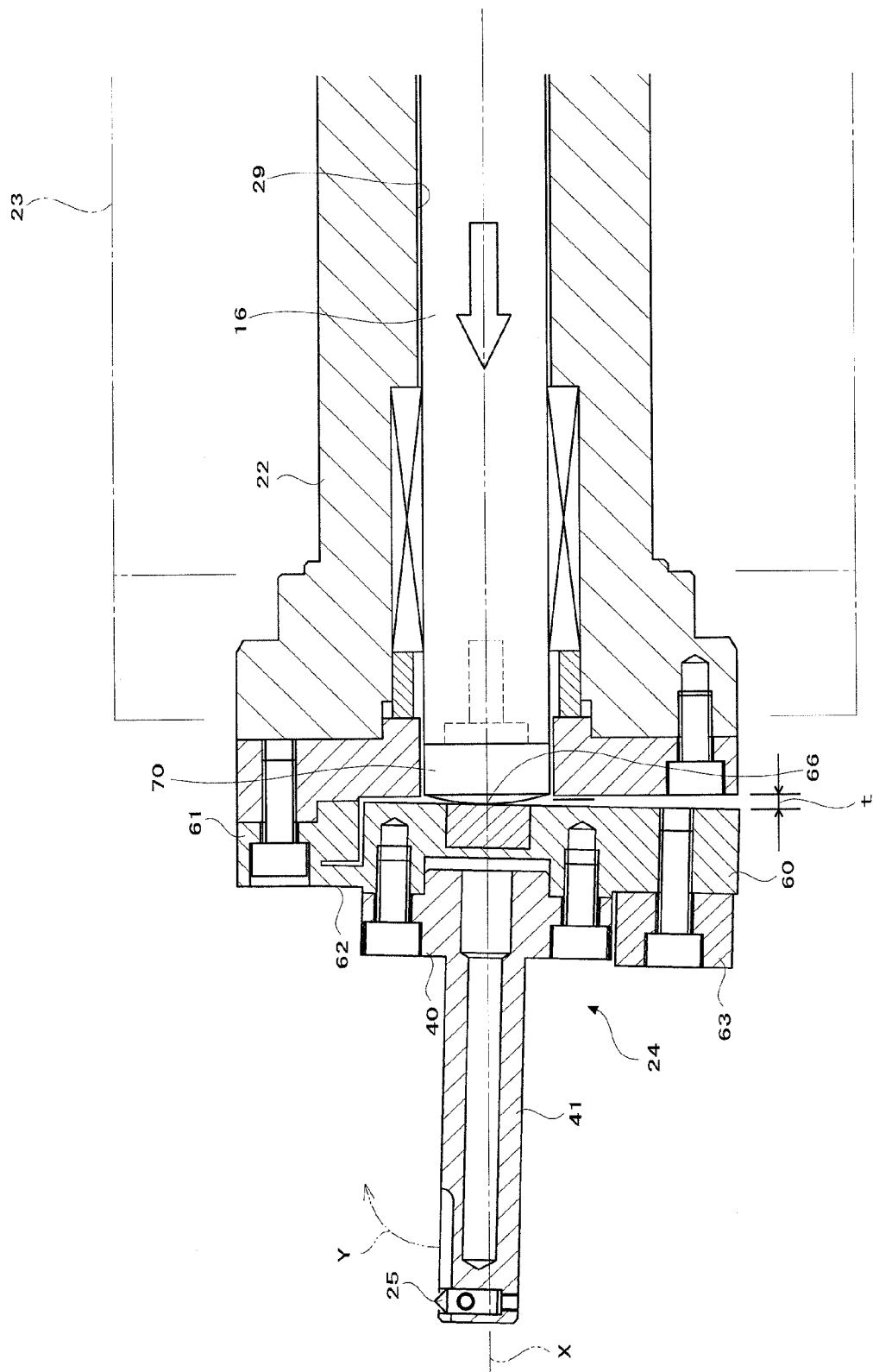
FIG. 7 is a cross-sectional view showing the principal parts of the boring device.
Figure 8:
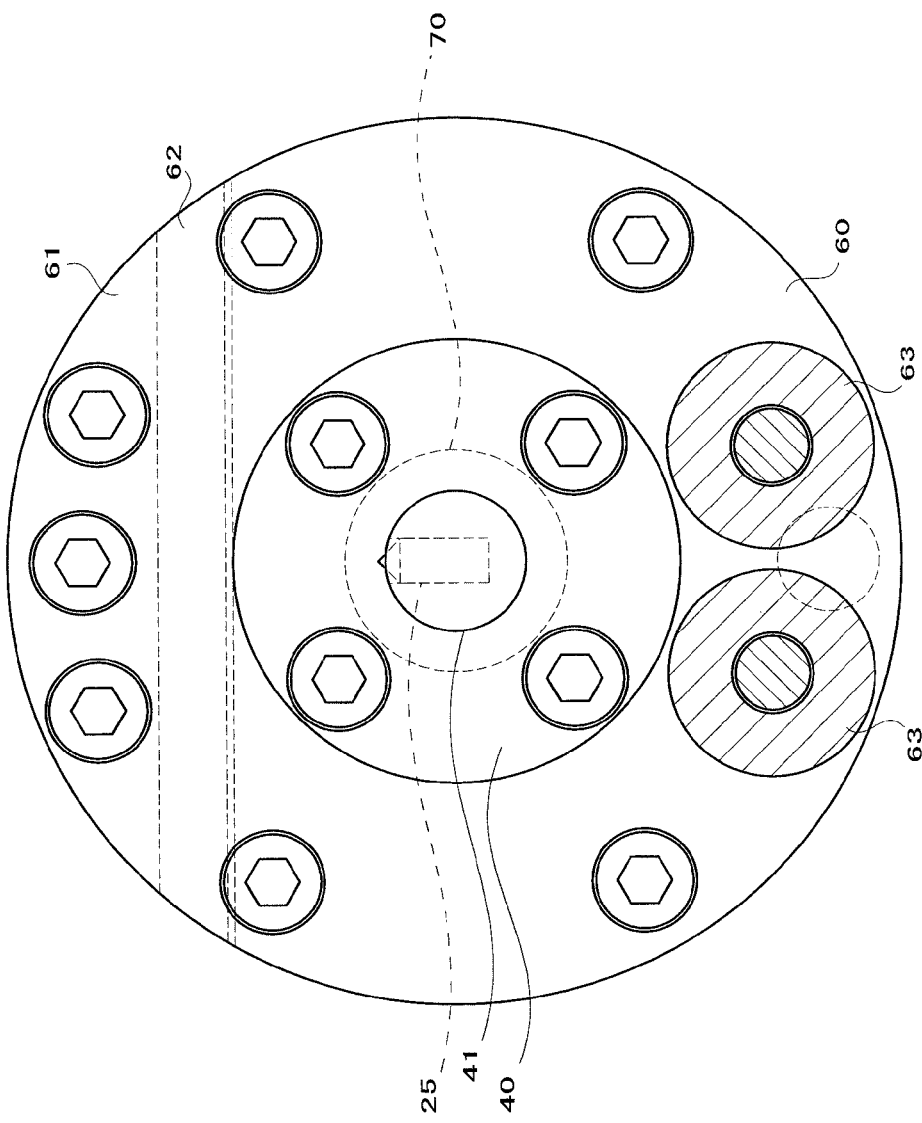
FIG. 8 shows a view of FIG. 7 as seen from the left side.
Figure 9:
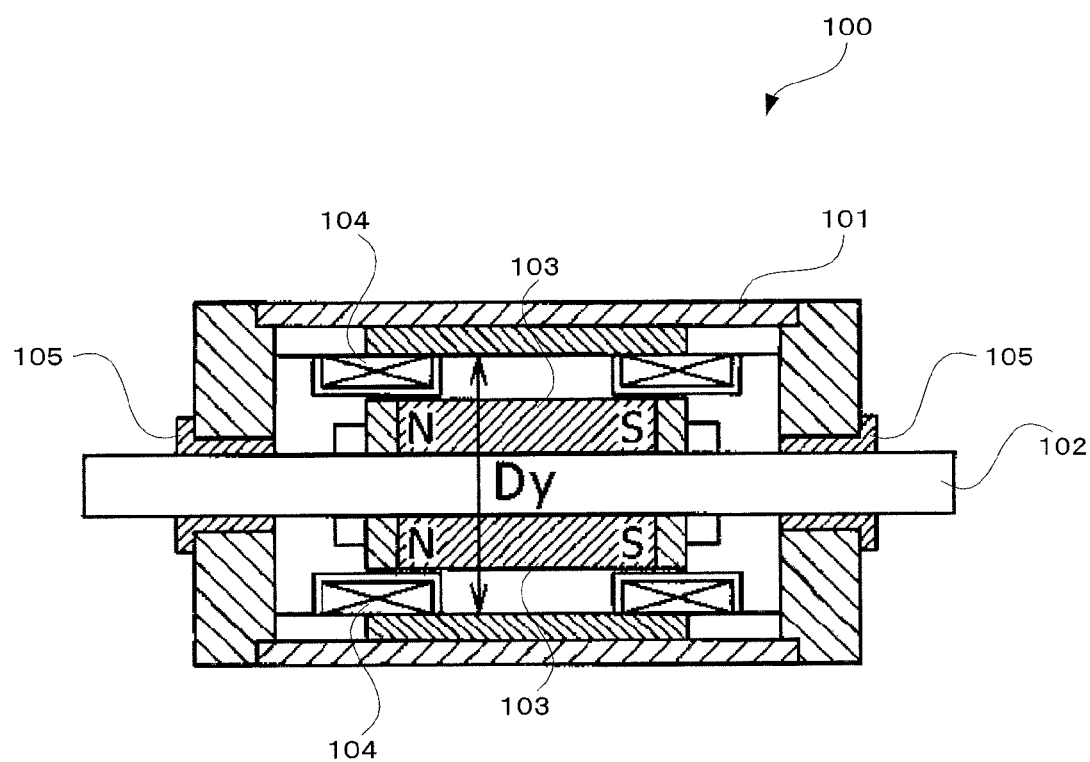
FIG. 9 is a cross-sectional view illustrating a conventional linear actuator.

The linear actuator having the structure described above is applicable to a boring device. Hereunder, a boring device according to one embodiment of the present invention is explained with reference to the attached drawings. FIG. 5 is a longitudinal cross-sectional view of a boring device according to one embodiment of the present invention. FIGS. 6 and 7 are cross-sectional views showing the principal parts of the boring device. FIG. 8 shows a view of FIG. 7 as seen from the left side. Note that, in the following explanation, the left side in the figures is referred to as the "front side or anterior direction" and the right side is referred to as the "rear side or posterior direction." In FIG. 5, the components that are the same or similar to those shown in FIG. 2 are designated by the same reference numerals, and their descriptions are omitted.

The boring device 21 of the present embodiment is an apparatus to bore a workpiece w. As shown in FIGS. 5 and 6, the boring device 21 comprises a rotatable main shaft 22 extending along the axis line X (the lateral direction in FIG. 1), and a main shaft driving means 23 that rotationally drives the main shaft 22 about the axis line X. The boring device 21 is provided with a tool holder 24 connected to one end portion (the front end portion) of the main shaft 22 via a tilting unit 26, and a tool 25 held by a tool holder 24. The boring device 21 comprises a draw bar 16 that is slidable in the direction along the axis line X, and a draw bar driving means 28 that slides the draw bar 16 in the direction along the axis line X.

One example of the workpiece w is a piston in an engine, and a borehole can be formed in the workpiece w using the boring device 21. The workpiece w is held by a workpiece-holding means (not shown).

The main shaft 22 is formed from a metallic component extending in the axis line X direction (the lateral direction in FIG. 1) and comprises a hollow portion 29 formed by linearly boring the inside thereof. The hollow portion 29 extends in the direction along the axis line X from one end portion (the front end portion) to the other end portion (the rear end portion) of the main shaft 22 so as to penetrate the main shaft 22. Thereby, the main shaft 22 is formed to be almost cylindrical.

The structure of the main shaft driving means 23 is not particularly limited as long as it can rotationally drive the main shaft 22 about the axis line X. In the present embodiment, a known built-in motor that can rotate the shaft in the casing is used. Furthermore, the main shaft driving means 23 is provided on a table 31 that is movable in the anteroposterior direction (the lateral direction in FIG. 1). In this structure, the main shaft driving means 23 and the main shaft 22 are designed so that they can be shifted in the direction along the axis line X by shifting the table 31 back and forth in the direction along the axis line X. The structure of the table 31 is not particularly limited. In the present embodiment, by locating the table 31 on a rail (not shown) on the base 32, the table 31 can be shifted back and forth along the rail. The amount of shift of the table 31 can be suitably adjusted by the operation of an actuator 33.

The tool holder 24 is provided with a plate-like holder-coupling member 40 and a shank 41 extending from the holder-coupling member 40 in the direction along the axis line X. The holder-coupling member 40 is fixed to the tilting unit 26 in the portion anterior to the main shaft 22 using a bolt. Furthermore, the shank 41 extends in a rod-like shape from the central portion of the holder-coupling member 40 in the forward direction along the axis line X, and a tool 25 is provided on the tip portion thereof. The tool holder 24 having such a structure is fixed to the main shaft 22 by means of the tilting unit 26 and rotates in accordance with the rotation of the main shaft 22.

The tool 25 is not particularly limited as long as it can bore the workpiece w by the rotation of the tool holder 24, and, for example, a strong cutter formed from a sharp-pointed metal can be used. The tool 25 is detachably fitted to the front end portion of the shank 41 of the tool holder 24, and protrudes from the shank 41 while tilting relative to the axis line X.

The draw bar 16 is formed from a rod-like member extending in the direction along the axis line X and inserted into the hollow portion 29 of the main shaft 22 so as to be capable of reciprocal movement along the axis line X and capable of rotating about the axis line X. The draw bar 16 further comprises a pushing member 70 on the tip portion thereof, and is arranged so that the front end face of the pushing member 70 fits the front end of the main shaft 22. The pushing member 70 is formed from a hardened steel, and structured so that when the draw bar 16 shifts forward, the pushing member 70 fitted to the tip portion thereof protrudes from the front end of the main shaft 22 (the front end of the hollow portion 29) toward the anterior portion of the main shaft 22 to push the tilting unit 26. The rear end portion of the draw bar 16 protrudes toward the posterior portion of the main shaft 22 from the rear end of the main shaft 22 (the rear end of the hollow portion 29) so as to be connected to the draw bar driving means 28.

In the present embodiment, the linear actuator 1 described above is used as the draw bar driving means 28, wherein the rear end portion of the draw bar 16 is rotatably fixed to the bearing 15 of the linear actuator 1. This arrangement allows the reciprocation of the slider 5 to be transmitted to the draw bar 16 via the bearing 15.

The tilting unit is explained in detail below with reference to the attached drawings. As shown in FIGS. 6 to 8, the tilting unit 26 comprises a base 60 fixed to the tool holder 24, a fixing member 61 fixed to the front end portion of the main shaft 22, and a coupling member 62 connecting one end portion of the base 60 to the fixing member 61. The tilting unit 26 further comprises a balancing member 63 that is fixed to the other end portion of the base 60.

The base 60 is in contact with the rear end face of the holder-coupling member 40 of the tool holder 24, and is fixed to the holder-coupling member 40 using a bolt. The base 60 is provided with, in its rear end portion, a contact member 66 including a spherical surface part with which the pushing member 70 of the draw bar 16 comes into contact so as to be pushed forward by the draw bar 16. A gap t is formed between the base 60 and the front end portion of the main shaft 22, and an O-ring or like elastic material is placed in the gap t.

The fixing member 61 is fixed to the main shaft 22 in such a manner that it protrudes forward from the front end of the main shaft 22 at a location apart from the axis line X. In the present embodiment, the fixing member 61 is located at a position upwardly apart from the axis line X under the condition wherein the main shaft 22 is not rotated, and the fixing member 61 is fixed to the upper end portion of the main shaft 22 using a bolt. The coupling member 62 is formed into a plate-like shape and connects the upper end portion of the base 60 and the front end portion of the fixing member 61.

The fixing member 61 and the coupling member 62 are formed of a metal and are elastically deformable. In this arrangement, when the base 60 is pushed forward by the draw bar 16, the fixing member 61 and the coupling member 62 are bent due to elastic deformation. This allows, as shown by the dotted lines Y in FIG. 7, the base 60 to tilt with the area around the coupling member 62 as its rotation center, and the tool holder 24 to tilt accordingly. As a result, the tool 25 becomes eccentric relative to the axis line X to change the processing position.

The balancing member 63 is fixed to the base 60 at a location apart from the axis line X in the direction opposite to the fixing member 61. In the present embodiment, the balancing member 63 is located at a position downwardly apart from the axis line X under the condition wherein the main shaft 22 is not rotated, and fixed to the lower end portion of the base 60 using a bolt. The structure of the balancing member 63 is not particularly limited as long as it can function as a weight for the base 60. In the present embodiment, the balancing member 63 is formed of a metal. The weight of the balancing member 63 may be suitably selected.

Subsequently, the process for boring workpiece w using the boring device 21 having the structure described above is explained below.

The process for boring workpiece w is performed as follows. First, the locations of the workpiece w and the boring device 21 are adjusted. The main shaft 22 is then rotated by rotating the main shaft driving means 23 under the condition wherein the tool 25 is placed in contact with the workpiece w to rotate the tool holder 24 connected to the main shaft 22. This accordingly rotates the tool 25 that is fixed to the tool holder 24 so as to bore the workpiece w due to the rotation of the tool 25. As a result, a borehole having a predetermined diameter is formed in the workpiece w.

The diameter of the borehole of the workpiece w can be adjusted as follows. The draw bar driving means 28 (linear actuator 1) is operated to shift the draw bar 16 forward in the direction along the axis line X, so that the draw bar 16 pushes the base 60 of the tool holder 24 forward. When the base 60 is pushed, the fixing member 61 and the coupling member 62 of the tool holder 24 are elastically deformed. According to this elastic deformation, the base 60 tilts with the area around the coupling member 62 as its rotation center. As a result, the tool holder 24 fixed to the base 60 also tilts and the tool 25 fixed to the tip portion of the tool holder 24 becomes eccentric relative to the axis line X in the direction shown by the arrow Y. The processing position of the tool 25 is thereby adjusted. When the main shaft driving means 23 is rotated in the same manner as described above under such conditions, the main shaft 22 is accordingly rotated and the tool holder 24 connected to the main shaft 22 is thereby rotated. The tool 25 thereby rotates and a borehole is formed in the workpiece w due to the rotation of the tool 25. As a result, the workpiece w is bored under the condition wherein the location of the tool 25 is adjusted; therefore, the diameter of the borehole is accordingly adjusted to obtain a workpiece w having a borehole with a desirable diameter. Furthermore, if the tilting angle of the tool 25 is changed while the tool 25 turns, a non-circular borehole can be formed. If the tilting angle of the tool 25 is adjusted while shifting the table 31 forward or backward in the direction along the axis line X, a borehole broadened toward the end (or narrowed toward the end) can be formed.

After boring is completed, the draw bar driving means 28 (linear actuator 1) is operated in the opposite direction to pull the draw bar 16 backward. This releases the pressure applied to the base 60, and the tool 25 thereby returns to the original position.

A boring device according to one embodiment of the present invention is explained above; however, the details of the embodiment of the present invention are not limited to the present embodiment.

For example, the present embodiment is structured so that the base 60 and the tool holder 24 fixed to the base 60 are pushed by sliding the draw bar 16. However, the structure is not limited to this and may be such that the tool holder 24 is pulled. In this case, the front end portion of the draw bar 16 and the base 60 are connected by a coupling member (not shown), and when the draw bar 16 slides backward due to the shift of the slider 3, the base 60 and the tool holder 24 fixed to the base 60 can be pulled due to the slide.

Furthermore, a known built-in type motor is used as the main shaft driving means 23 in the present embodiment. However, the structure may be such that the rotation power is transmitted from an outer motor to the main shaft 22 via a gear or a belt. Such a structure also allows the main shaft 22 to rotate about the axis line X to bore the workpiece w.

Both the fixing member 61 and the coupling member 62 are elastically deformable in the present embodiment. However, the structure is not limited to this and may be such that either the fixing member 61 or the coupling member 62 is elastically deformed. This structure also allows the base 60 to be rotated.

In the present embodiment, the relative position between the boring device 21 and the workpiece w in the axial direction (in the anteroposterior direction) can be adjusted by shifting the table 31 or by shifting the workpiece-holding means that holds the workpiece w.

Figure 10:
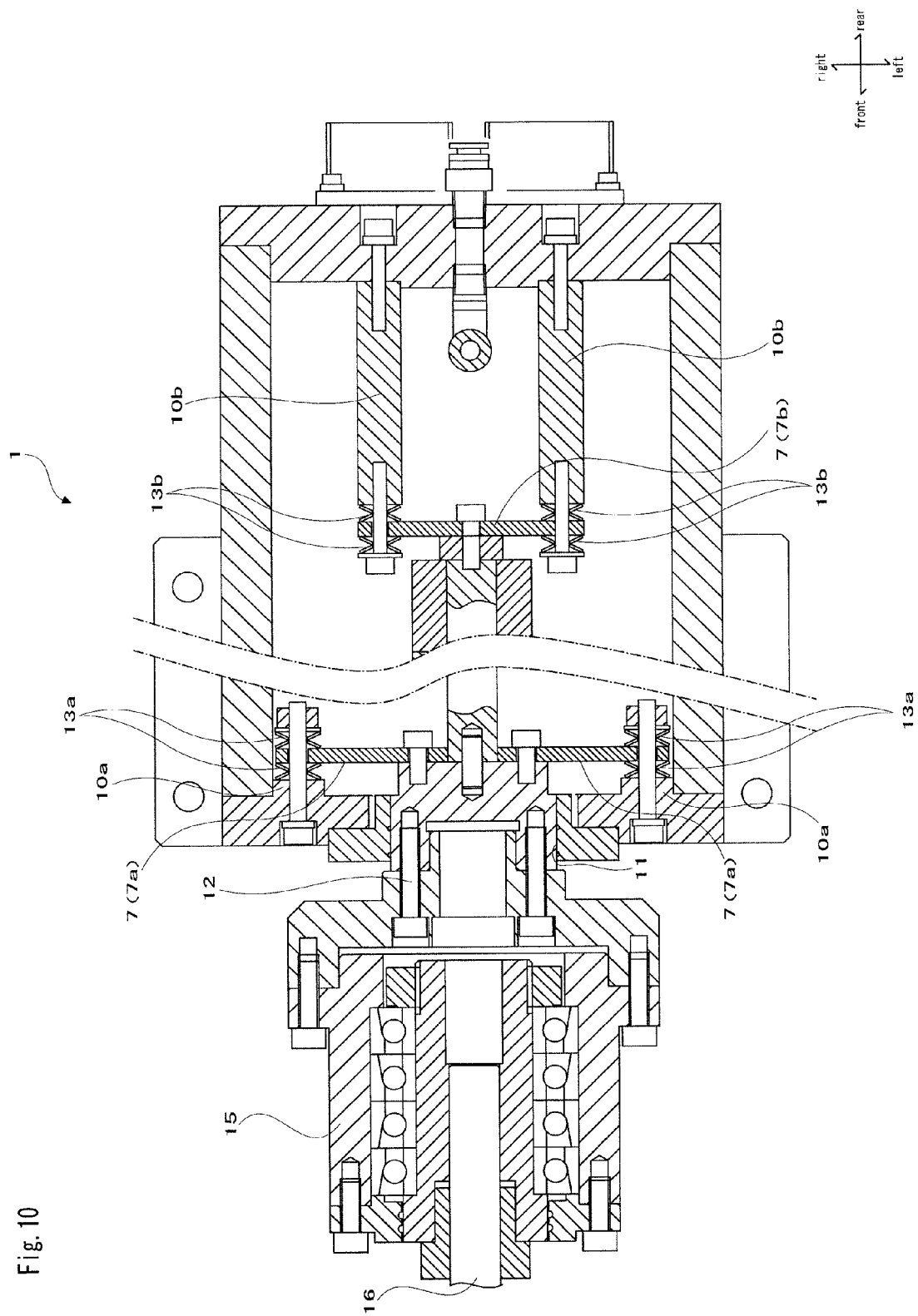
FIG. 10 is a cross-sectional view of the linear actuator according to another embodiment of the present invention.

In the present embodiment, the front flat springs 7a and the rear flat spring 7b of the linear actuator 1 are fixed to the front fixing members 10a and rear fixing members 10b, respectively; however, the structure thereof is not limited to this. FIG. 10 is a cross-sectional view of the linear actuator according to another embodiment of the present invention. In FIG. 10, a portion of the linear actuator is omitted. In FIG. 10, the components that are the same or similar to those shown in FIG. 1 are designated by the same reference numerals, and their descriptions are omitted. As shown in FIG. 10, in the linear actuator according to another embodiment of the present invention, the front flat springs 7a and the rear flat spring 7b are fixed to the front fixing members 10a and the rear fixing members 10b, respectively, via front plate springs 13a and rear plate springs 13b. The front plate springs 13a and the rear plate springs 13b are known diaphragm springs formed from a disc-like elastic body. Having such a structure also allows the slider 3 to be held by an elastic member (e.g., flat spring 7 and plate spring 13). Furthermore, the structure is not limited to that described above as long as the slider 3 can be held by an elastic member, and a coil spring may be used instead of the plate spring 13.

Figure 11:
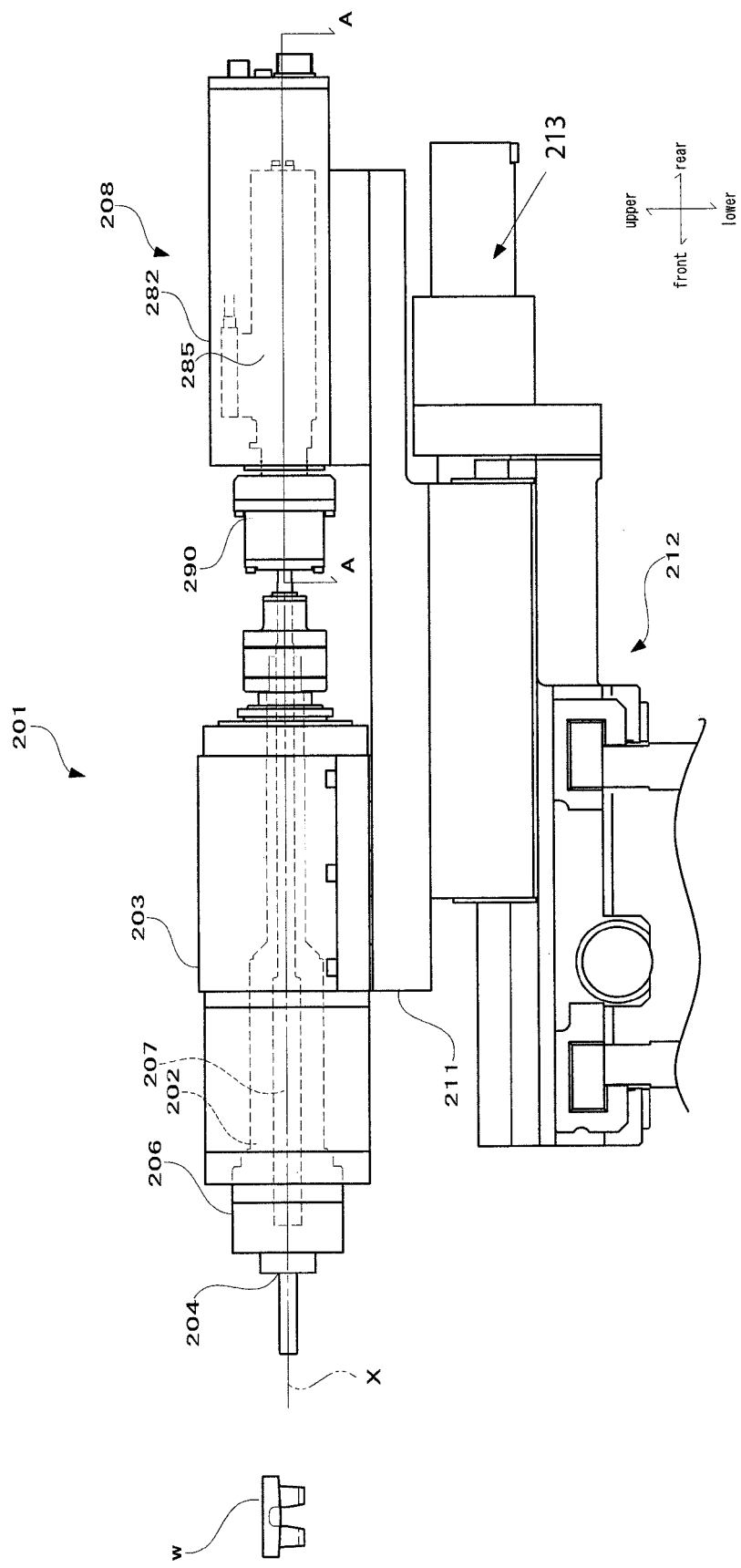
FIG. 11 is a side elevational view of the boring device according to another embodiment of the present invention.
Figure 12:
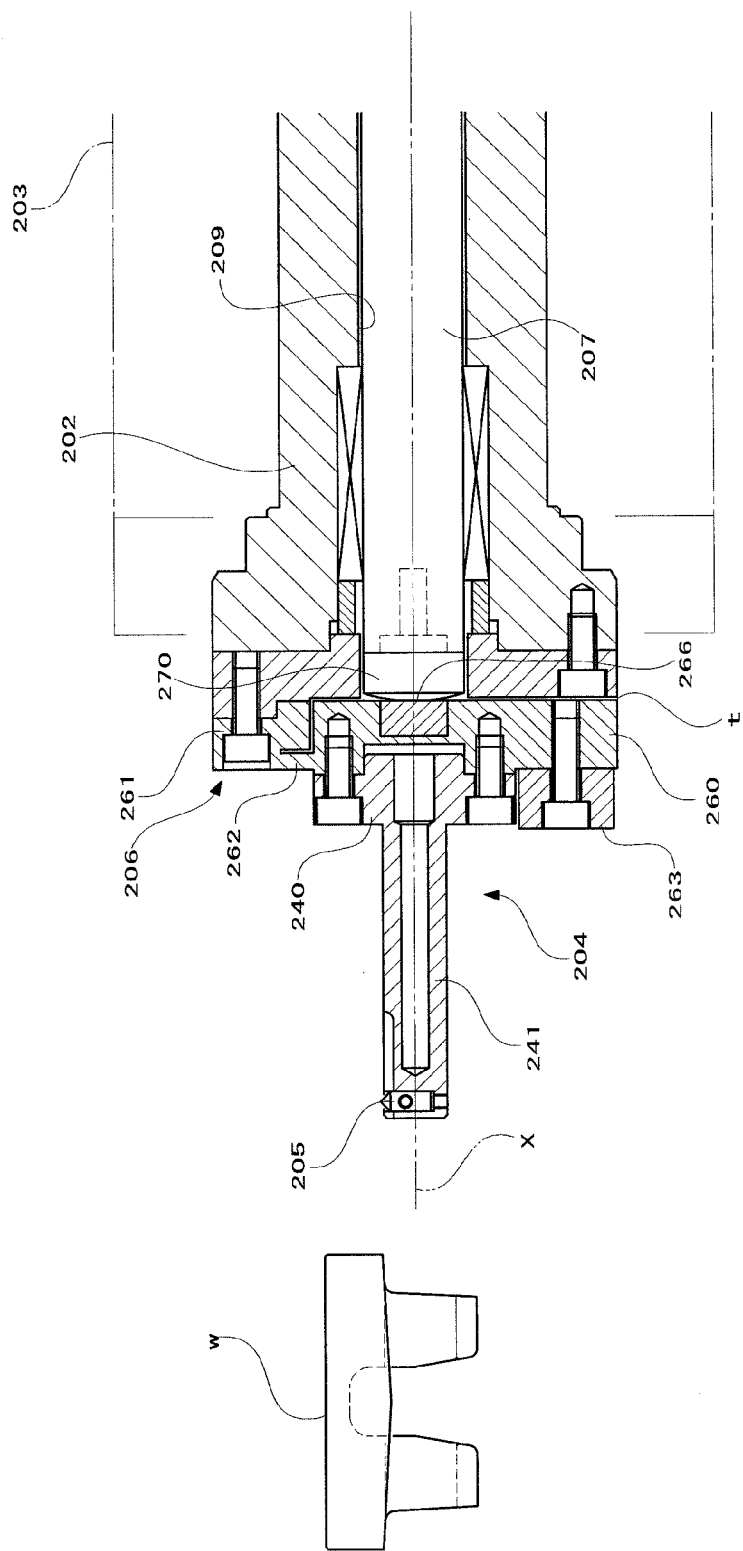
FIG. 12 is a cross-sectional view showing the principal parts of the boring device.
Figure 13:
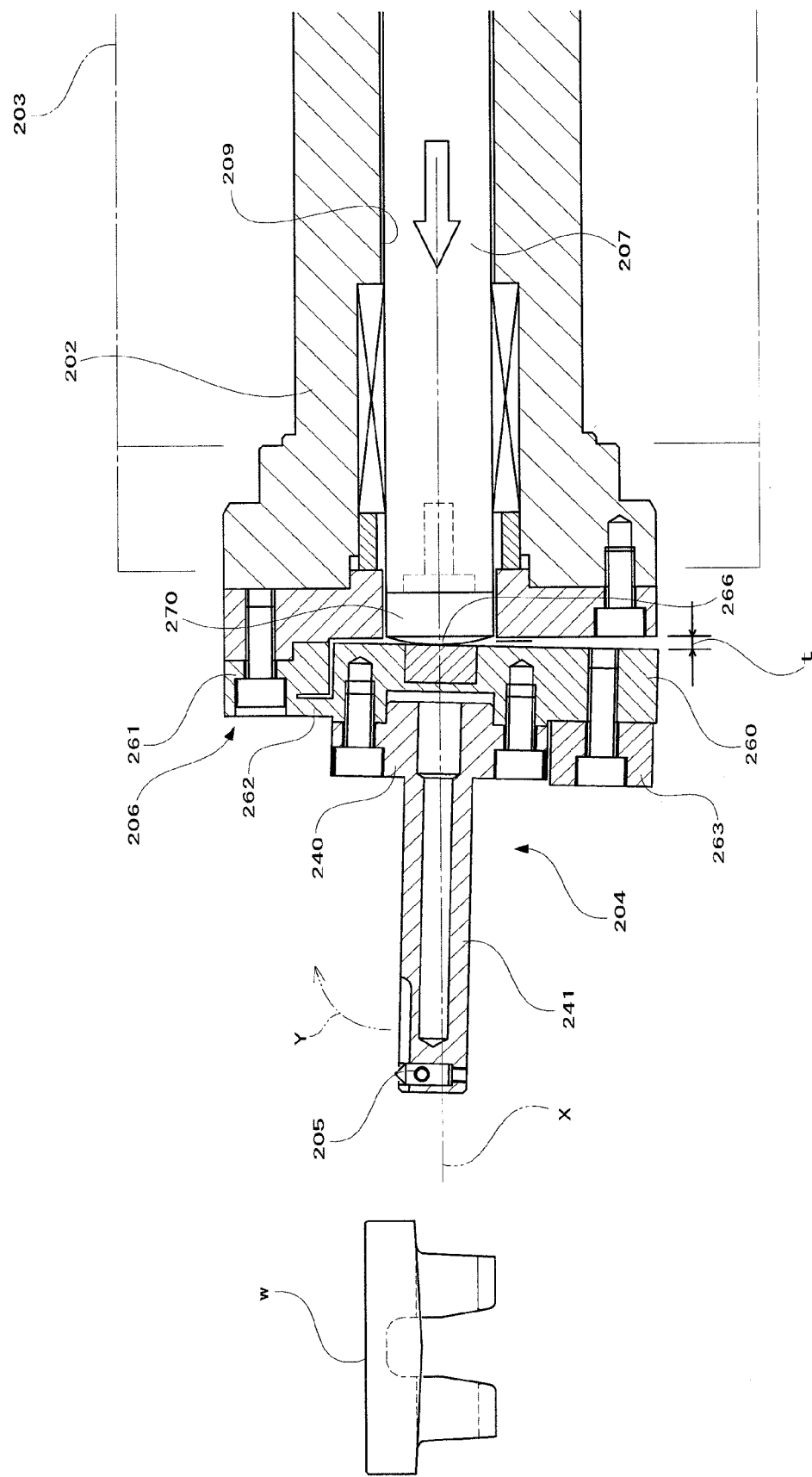
FIG. 13 is a cross-sectional view showing the principal parts of the boring device.
Figure 14:
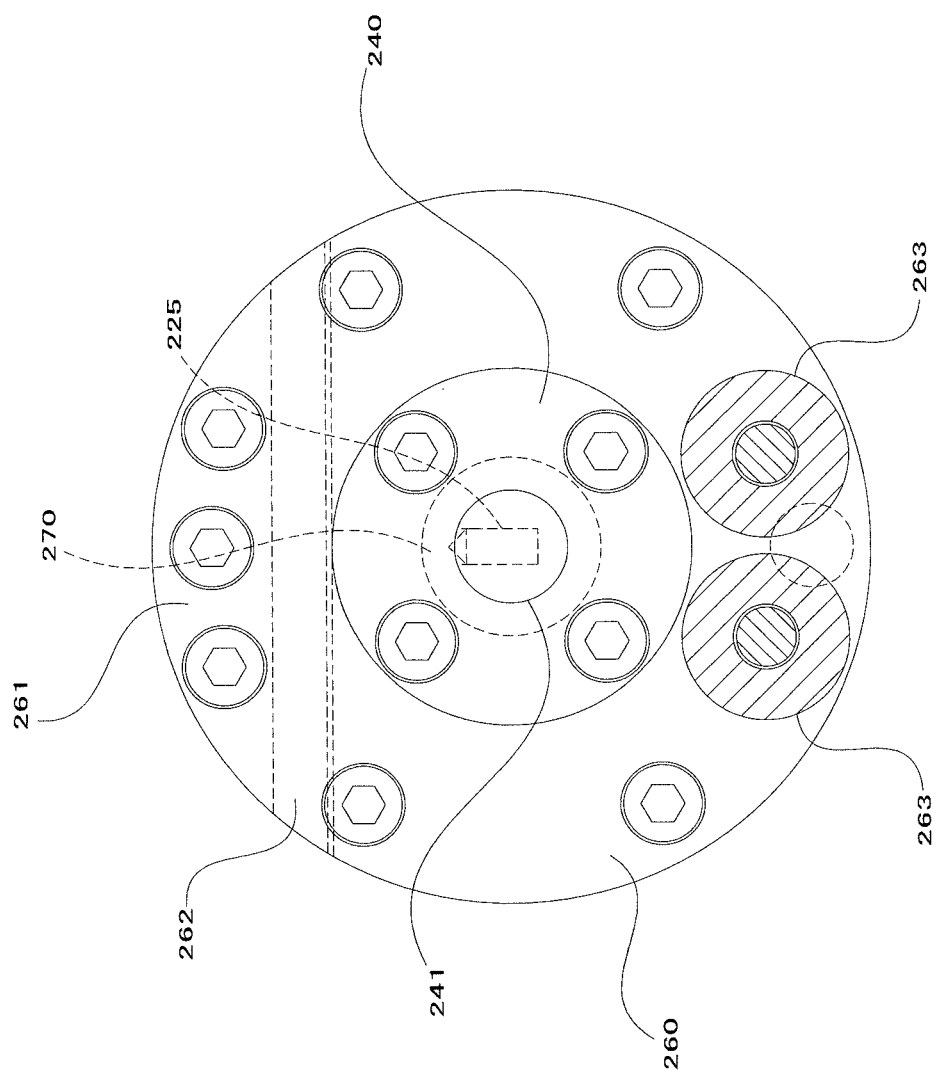
FIG. 14 shows a view of FIG. 13 as seen from the left.

Still another embodiment of the present invention is explained in detail below with reference to the attached drawings. FIG. 11 is a side elevational view of the boring device according to another embodiment of the present invention. FIGS. 12 and 13 are cross-sectional views showing the principal parts of the boring device. FIG. 14 shows a view of FIG. 13 as seen from the left side. Note that, in the following explanation, the left side in the figures is referred to as the "front side or anterior direction" and the right side is referred to as the "rear side or posterior direction."

The boring device 201 of the present embodiment is a device for boring a workpiece w. As shown in FIGS. 11 to 14, the boring device 201 is provided with a rotatable main shaft 202 extending in the direction along the axis line X (the lateral direction in FIG. 11) and a main shaft driving means 203 for rotating the main shaft 202 about the axis line X. The boring device 201 further comprises a tool holder 204 that is connected to one end portion (the front end portion) of the main shaft 202 via a tilting unit 206, and a tool 205 held by the tool holder 204. The boring device 201 further comprises a draw bar 207 that is slidable in the direction along the axis line X and a draw bar driving means 208 for sliding the draw bar 207 in the direction along the axis line X.

One example of the workpiece w is a piston in an engine, and a borehole can be formed in the workpiece w using the boring device 201. The borehole is, for example, a borehole into which a connecting pin for connecting an engine piston and a connecting rod is inserted. The workpiece w is held by a workpiece-holding means (not shown).

The main shaft 202 is formed from a metallic component extending in the direction along the axis line X (the lateral direction in FIG. 11) and comprises a hollow portion 209 formed by linearly boring the inside thereof. The hollow portion 209 extends from one end portion (the front end portion) to the other end portion (the rear end portion) of the main shaft 202 in the direction along the axis line X so as to penetrate the main shaft 202. The main shaft 202 is thereby formed to be almost cylindrical.

The main shaft driving means 203 is not particularly limited as long as it can rotate the main shaft 202 about the axis line X. In the present embodiment, a known built-in type motor that can rotate the shaft in the casing is used. The main shaft driving means 203 is placed on a table 211 that is movable in the anteroposterior direction (the lateral direction in FIG. 11). The main shaft driving means 203 is structured so that the main shaft driving means 203 and the main shaft 202 can be anteroposteriorly shifted in the direction along the axis line X by shifting the table 211 back and forth in the direction along the axis line X. The structure of the table 211 is not particularly limited. In the present embodiment, the table 211 is placed on a rail (not shown) on a base 212 so as to be movable back and forth along the rail. The amount of shift of the table 211 can be suitably controlled by a controller 213.

The tool holder 204 is provided with a plate-like holder-coupling member 240 and a shank 241 extending from the holder-coupling member 240 in the direction along the axis line X. The holder-coupling member 240 is fixed to a tilting unit 206 using a bolt in the portion anterior to the main shaft 202. The shank 241 extends in a rod-like shape from the central portion of the holder-coupling member 240 along the axis line X, and a tool 205 is fixed to its tip portion. The tool holder 204 having such a structure is fixed to the main shaft 202 by a tilting unit 206 and rotates in accordance with the rotation of the main shaft 202.

The tool 205 is not particularly limited as long as it can bore the workpiece w by the rotation of the tool holder 204, and, for example, a strong cutter formed from a sharp-pointed metal can be used. The tool 205 is detachably fitted to the peripheral surface of the front end portion of the shank 241 of the tool holder 204.

The draw bar 207 is formed from a rod-like member extending in the direction along the axis line X and inserted into the hollow portion 209 of the main shaft 202 so as to be reciprocal along the axis line X and rotatable about the axis line X. The draw bar 207 further comprises a pushing member 270 on the tip portion thereof, and is arranged so that the front end portion of the pushing member 270 forms a spherical surface and fits the front end of the main shaft 202. The pushing member 270 is formed from a hardened steel, and structured so that when the draw bar 207 shifts forward, the pushing member 270 fitted to the tip portion thereof protrudes from the front end of the main shaft 202 (the front end of the hollow portion 209) toward the anterior portion of the main shaft 202 to push the tilting unit 206. The rear end portion of the draw bar 207 protrudes toward the posterior portion of the main shaft 202 from the rear end of the main shaft 202 (the rear end of the hollow portion 209) so as to be connected to the draw bar driving means 208.

Figure 15:
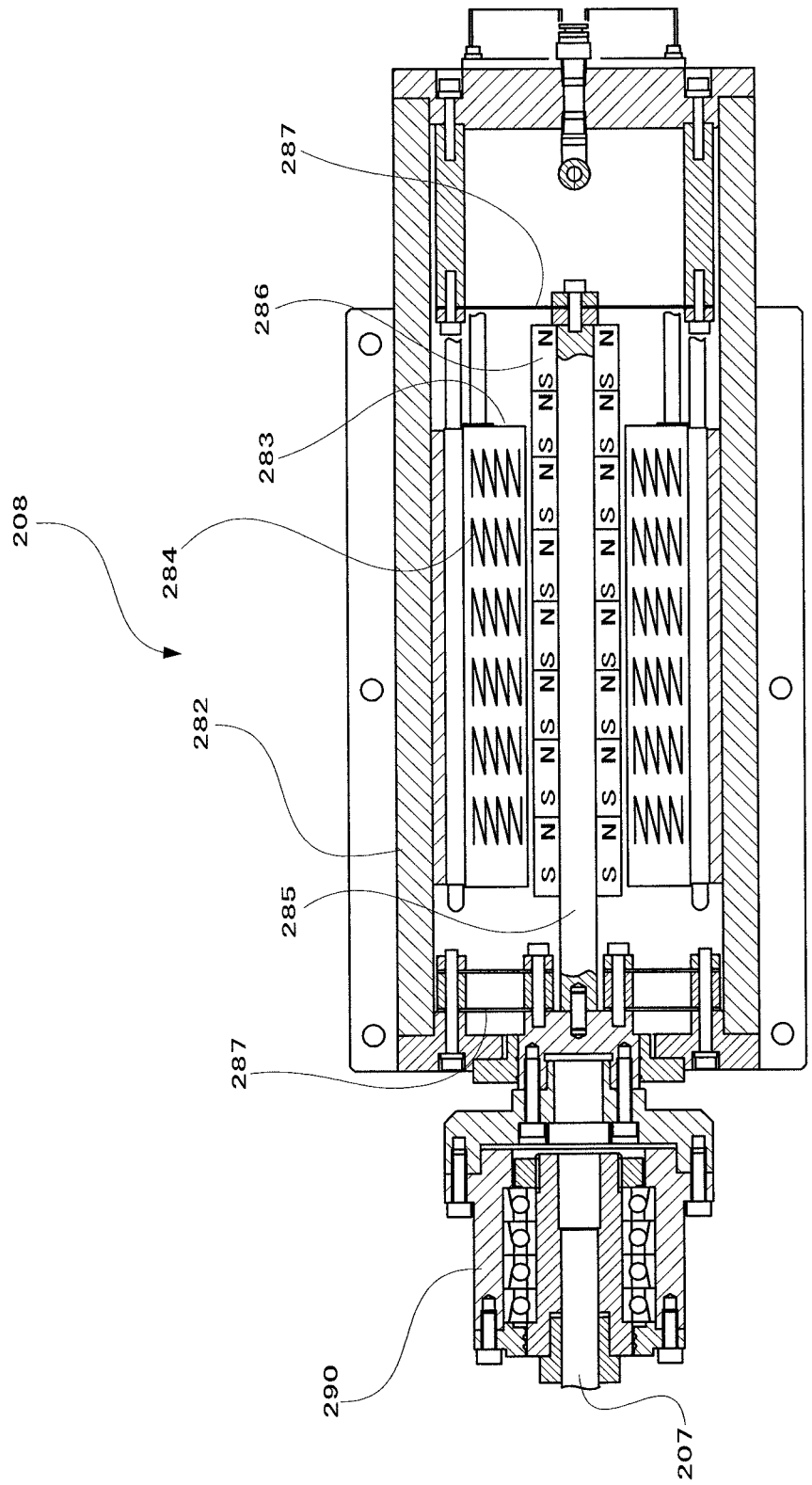
FIG. 15 is a cross-sectional view of FIG. 11 along line A-A.

The draw bar driving means 208 is not particularly limited as long as it can reciprocate the draw bar 207 in the direction along the axis line X, and, for example, a known linear actuator can be used. FIG. 15 is a cross-sectional view of FIG. 11 along line A-A. As shown in FIGS. 11 and 15, the draw bar driving means of the present embodiment 208 (linear actuator) comprises a horizontally arranged body casing 282, a plate-like slider 285 disposed inside the body casing 282, and a plurality of magnets 286,286 . . . fixed to the right and left sides of the slider 285. The draw bar driving means 208 further comprises a pair of coil cases 283,283 disposed on the left and right sides of the slider 285 arranged so as to surround the slider 285 to which the magnets 286 are fixed, and a plurality of coils 284,284 . . . disposed in each of the coil cases 283. The draw bar driving means 208 further comprises a plurality of bearing members 287,287 . . . that support either the front end portion or the rear end portion of the slider 285.

The slider 285 linearly extends in the anteroposterior direction (the lateral direction in the figure) and is arranged so as to reciprocate in the body casing 282 back and forth in the direction along the axis line X. A bearing 290 is fixed to the front end portion of the slider 285, and the rear end portion of the draw bar 207 is rotatably fixed to the bearing 290. Therefore, the reciprocating movement of the slider 285 can be transferred to the draw bar 207 via the bearing 290.

In the draw bar driving means 208 having such a structure, when a current is applied to the coils 284, due to the interaction between the energized coils 284 and magnets 286, the slider 285 shifts relative to the body casing 282 in the direction along the axis line X. The reciprocation of the slider 285 is transferred to the draw bar 207 via the bearing 290. The amount of shift of the slider 285 can be suitably adjusted by a controller (not shown) by controlling the amount of current applied to the coils 284. Furthermore, by changing the energizing direction (i.e., the direction current is applied) of the coils 284, the traveling direction of the slider 285 can be converted.

The tilting unit is explained in detail below with reference to the attached drawings. As shown in FIGS. 12 to 14, the tilting unit 206 comprises a base 260 fixed to the tool holder 204, a fixing member 261 fixed to the front end portion of the main shaft 202, and a coupling member 262 connecting one end portion of the base 260 to the fixing member 261. The tilting unit 206 further comprises a balancing member 263 that is fixed to the other end portion of the base 260.

The base 260 is in contact with the rear end face of the holder-coupling member 240 of the tool holder 204, and is fixed to the holder-coupling member 240 using a bolt. The base 260 is provided with, in its rear end portion, a contact member 266 to which the pushing member 270 of the draw bar 207 comes into contact so as to be pushed forward by the draw bar 207. Between the base 260 and the front end portion of the main shaft 202, a gap t is provided whose size is changeable to a predetermined level by adjusting the amount of protrusion of the pushing member 270.

The fixing member 261 is fixed to the main shaft 202 in such a manner that it protrudes forward from the front end of the main shaft 202 at a location apart from the axis line X. In the present embodiment, the fixing member 261 is located at a position upwardly apart from the axis line X under the condition wherein the main shaft 202 is not rotated, and it is fixed to the upper end portion of the main shaft 202 using a bolt. The coupling member 262 is formed into a plate-like shape and connects the upper end portion of the base 260 and the front end portion of the fixing member 261.

The coupling member 262 connects the fixing member 261 with the base 260 in an integral manner. The coupling member 262 is formed of a metal and elastically deformable when the base 260 departs from or approaches the main shaft. In this arrangement, when the base 260 is pushed forward by the draw bar 207, the coupling member 262 is bent due to elastic deformation. This allows, as shown by the dotted lines Y in FIG. 13, the base 260 to oscillate with the area around the coupling member 262 as its rotation center, and the tool holder 204 to tilt accordingly. As a result, the tool 205 becomes eccentric relative to the axis line X.

The balancing member 263 is fixed to the base 260 at a location apart from the axis line X in the direction opposite to the fixing member 261 (position opposite to the fixing member 261). In the present embodiment, the balancing member 263 is located at a position downwardly apart from the axis line X under the condition wherein the main shaft 202 is not rotated, and fixed to the lower end portion of the base 260 using a bolt. The structure of the balancing member 263 is not particularly limited as long as it can function as a weight for the base 260. In the present embodiment, the balancing member 263 is formed of a metal. The weight of the balancing member 263 may be suitably selected.

The process for boring workpiece w using the boring device 201 is explained below.

First, the locations of the workpiece w and the boring device 201 are adjusted. The main shaft 202 is then rotated by rotating the main shaft driving means 203 under the condition wherein the tool 205 is placed in contact with the workpiece w to rotate the tool holder 204 connected to the main shaft 202 about the axis line X. This accordingly rotates the tool 205 that is fixed to the tool holder 204 so as to bore the workpiece w due to the rotation of the tool 205. As a result, a borehole having a predetermined diameter is formed in the workpiece w.

The diameter of the borehole of the workpiece w can be adjusted as follows. The draw bar driving means 208 is operated to shift the draw bar 207 forward in the direction along the axis line X, so that the draw bar 207 pushes the base 260 of the tool holder 204 forward. When the base 260 is pushed, the fixing member 261 and the coupling member 262 of the tool holder 204 are elastically deformed. According to this elastic deformation, the base 260 oscillates with the area around the coupling member 262 as its rotation center. As a result, the tool holder 204 fixed to the base 260 tilts and the tool 205 fixed to the tip portion of the tool holder 204 becomes eccentric relative to the axis line X in the direction shown by the arrow Y. The location of the tool 205 is thereby adjusted. When the main shaft driving means 203 is rotated in the same manner as described above under such conditions, the main shaft 202 is accordingly rotated and the tool holder 204 connected to the main shaft 202 is thereby rotated. The tool 205 thereby rotates and the workpiece w is bored under the condition wherein the location of the tool 25 is adjusted. Therefore, the diameter of the borehole is accordingly adjusted to thereby obtain a workpiece w having borehole with a desirable diameter.

After boring is completed, the draw bar driving means 208 is operated in the opposite direction to pull the draw bar 207 backward. This releases the pressure applied to the base 260, and, as a result, the tool 25 returns to the original position. In the boring device of the present invention, because a balancing member 263 is fixed to the base 260, the base 260 securely returns to the original position due to the weight of the balancing member 263. This makes it possible to retain the tilting unit 206 in an original condition and maintain good quality. As a result, boring can be repeated with a uniform level of accuracy.

One embodiment of the present invention is explained above. However, the specific embodiment of the present invention is not limited to the present embodiment.

For example, a known built-in type motor is used as the main shaft driving means 203 in the present embodiment. However, the structure may be such that the rotation power is transmitted from an outer motor to the main shaft 202 via a gear or a belt. Such a structure also allows the main shaft 22 to rotate about the axis line X to bore the workpiece w.

Furthermore, a linear actuator is used as the draw bar driving means 208 in the present embodiment. However, the structure is not limited to this, and, for example, a known mechanism that is provided with a motor, ball screw or the like for transforming rotary motion into rectilinear motion may be used. Such a structure also allows the draw bar 207 to slide in the anteroposterior direction.

Both the fixing member 261 and the coupling member 262 are elastically deformable in the present embodiment. However, the structure is not limited to this and may be such that either the fixing member 261 or the coupling member 262 is elastically deformed. This structure also allows the base 260 to be rotated.

In the present embodiment, the relative position between the boring device 201 and the workpiece w in the axial direction (in the anteroposterior direction) can be adjusted by shifting the table 211, or by shifting the workpiece-holding means that holds the workpiece w.

Figure 16:
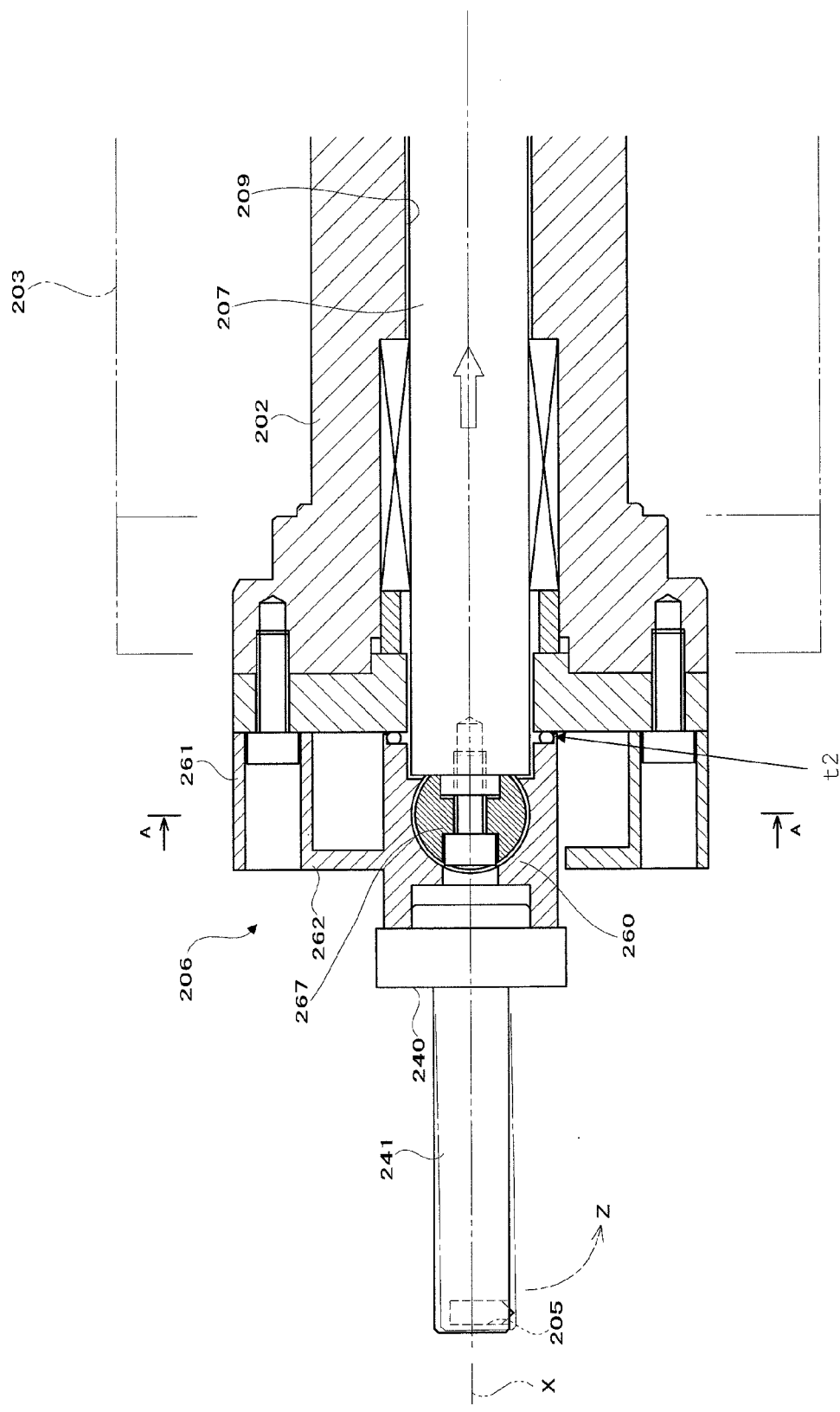
FIG. 16 is a cross-sectional view of the principal parts of the boring device according to still another embodiment of the present invention.
Figure 17:
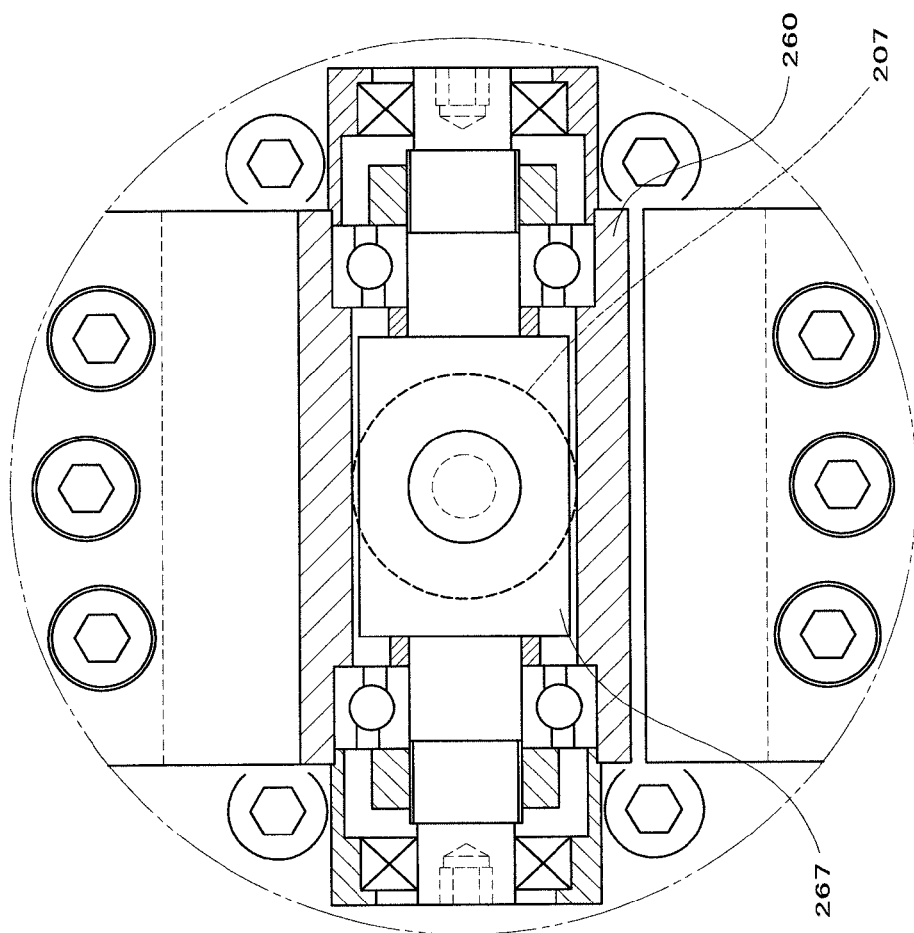
FIG. 17 is a cross-sectional view of FIG. 16 along line A-A.
Figure 18:
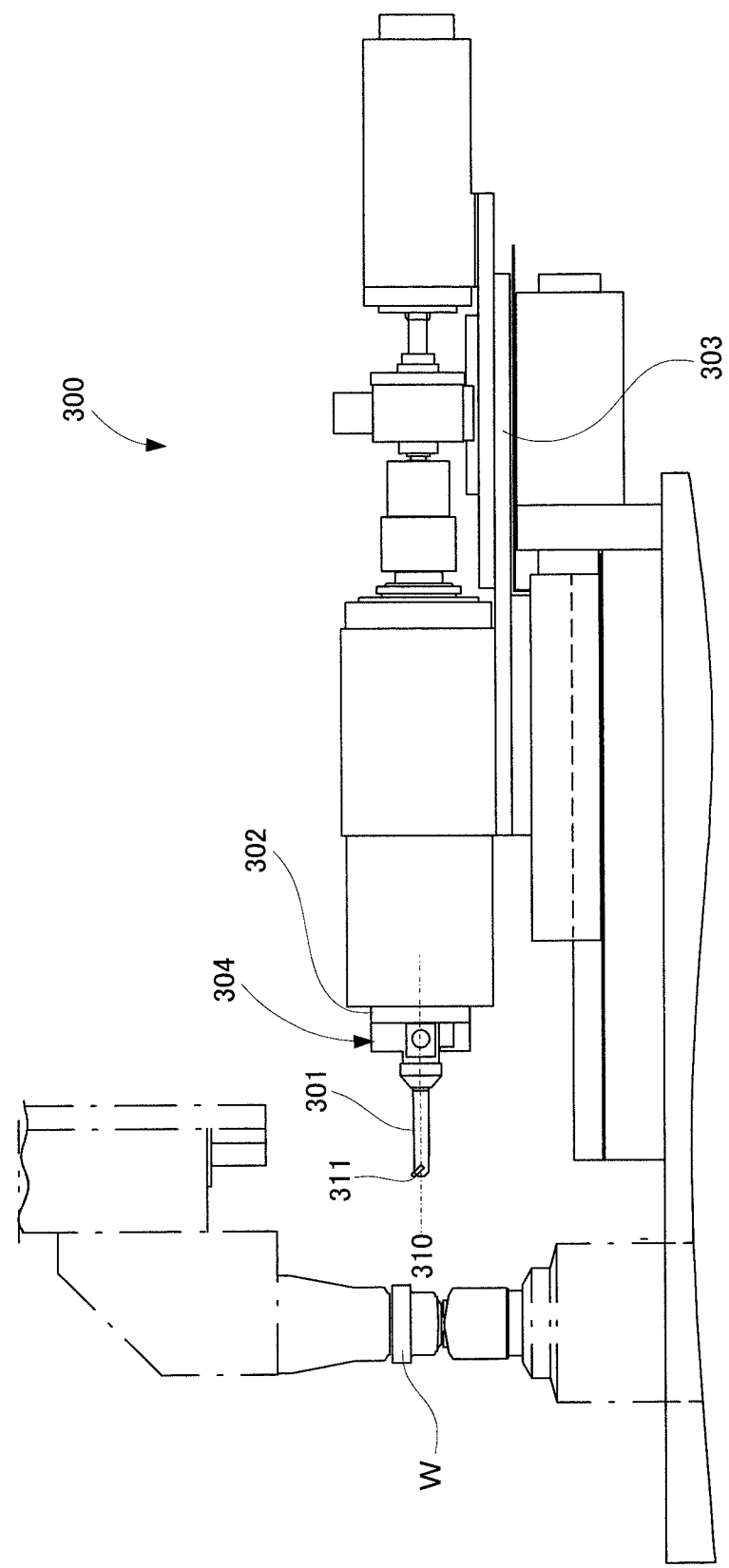
FIG. 18 is a side elevational view of a conventional boring device.
Figure 19:
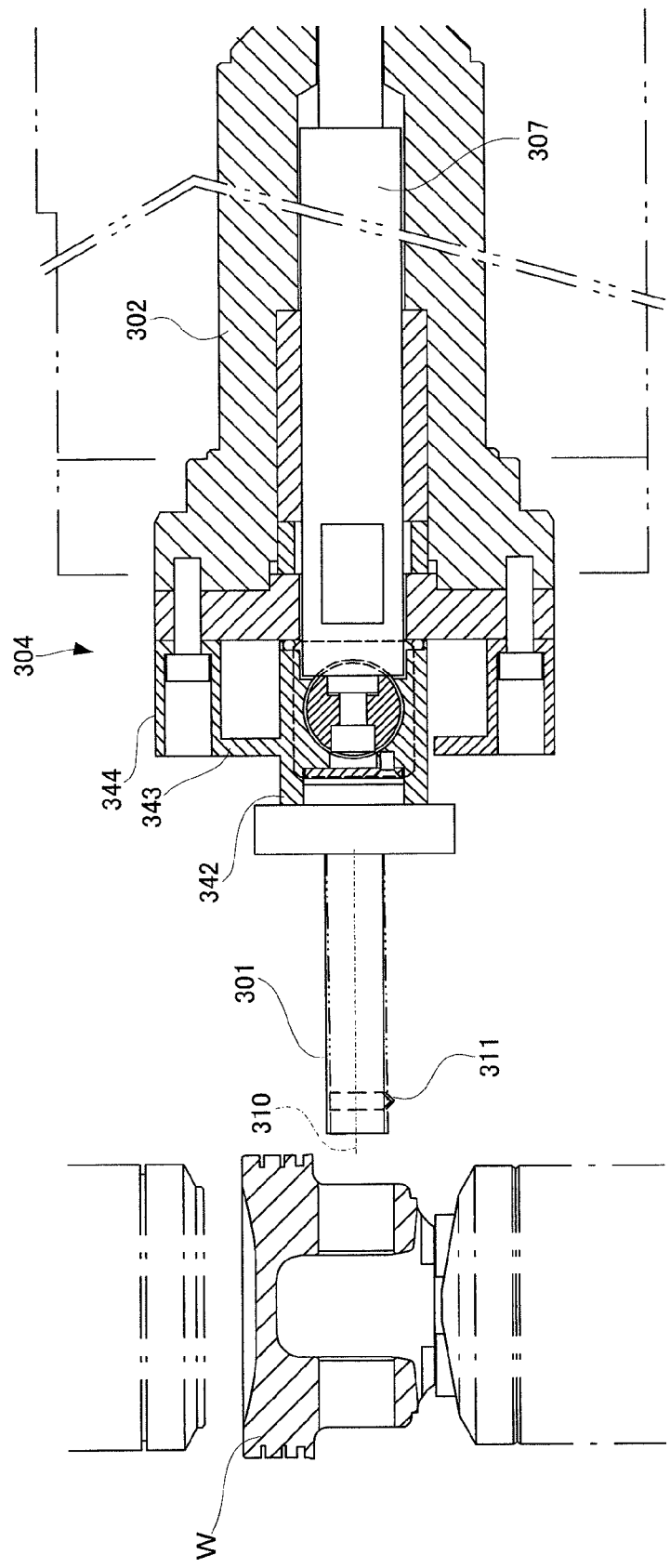
FIG. 19 is a cross-sectional view of the principal parts of a conventional boring device.

The present embodiment is so structured that the base 260 of the tilting unit 206 is pushed by the draw bar 207; however, the base 260 may be pulled. FIG. 16 is a cross-sectional view of the principal parts of the boring device according to still another embodiment of the present invention. FIG. 17 is a cross-sectional view of FIG. 16 along line A-A. In FIG. 16 or 17, the components that are the same or similar to those shown in FIG. 13 or 14 are designated by the same reference numerals, and their descriptions are omitted.

As shown in FIGS. 16 and 17, the tilting unit 206 comprises a base 260 fixed to a tool holder 204, a fixing member 261 for fixing the base 260 to the tip portion of the main shaft 202, and a coupling member 262 for connecting one end portion of the base 260 to the fixing member 261. A gap t2 is provided between the back surface of the base 260 and the front end portion of the main shaft 202. The size of the gap t2 is changeable from a predetermined amount to 0 due to the degree of insertion or withdrawal of the draw bar 207 described below. In order to maintain the initial predetermined size of the gap t2, an O-ring or like elastic material is disposed.

A trunnion member 267 connected to the tip portion of the draw bar 207 is provided inside the base 260. The trunnion member 267 is disposed in the central portion of the base 260, and connects and supports the base 260 and the draw bar 207 in such a manner that the base 260 can rotate about the draw bar 207 via a bearing. In this structure, when the draw bar 207 slides backward (toward the right side in the figure), the base 260 is pulled by the draw bar 207, and the base 260 oscillates in the direction shown by arrow Z while compressing the elastic material (O-ring). As a result, the tool holder 204 fixed to the base 260 tilts and the tool 205 fixed to the tip of the tool holder 204 becomes eccentric relative to the axis line X in the direction shown by the arrow Z. The location of the tool 205 is thus adjusted.

EXPLANATION OF NUMERAL SYMBOLS 1 linear actuator
2 body casing
3 slider
4 coils
5 coil case
6 magnets
7 flat spring
7a front flat spring
7b rear flat spring
8 water jacket
10a front fixing members
10b rear fixing members
11 opening
21 boring device
22 main shaft
23 main shaft driving means
24 tool holder
25 tool
26 tilting unit
28 draw bar driving means
29 hollow portion
201 boring device
202 main shaft
203 main shaft driving means
204 tool holder
205 tool
206 tilting unit
207 draw bar
208 draw bar driving means
209 hollow portion
211 table
240 coupling member
241 shank
260 base
261 fixing member
262 coupling member
263 balancing member
270 pushing member

The invention claimed is:
1. A linear actuator comprising:
a slider provided in a body casing with linearly extending therein;
at least one magnet fixed to the slider along the axial direction of the slider; and
at least one coil supported by the body casing so as to surround the slider to which said at least one magnet is fixed;
the slider shifting relative to the body casing in the axial direction due to interaction between said at least one coil to which electric current is applied and said at least one magnet;
the linear actuator further comprising a plurality of elastic members, each supporting one end or the other end of the slider in the axial direction; and the elastic members elastically deforming due to a shift of the slider in the axial direction.

2. The linear actuator according to claim 1, wherein the elastic member is composed of a plurality of flat springs, the plurality of flat springs comprising at least one front flat spring that supports the front end portion of the slider in the axial direction, and at least one rear flat spring that supports the rear end portion of the slider in the axial direction, and the sum of the stiffness of said at least one front flat spring being greater than the sum of the stiffness of said at least one rear flat spring.

3. A boring device comprising:

a rotatable main shaft having a hollow portion in the direction along the axis line;

a main shaft driving means for rotating the main shaft about the axis line;

a tool holder connected to one end portion of the main shaft, the tool holder being capable of rotating with the main shaft and tilting relative to the axis line;

a tool supported by the tool holder;

a draw bar inserted in the hollow portion so as to be slidable in the direction along the axis line of the main shaft, the draw bar being connected to the tool holder, and tilting the tool holder by sliding; and a draw bar driving means for sliding the draw bar in the direction along the axis line, the draw bar driving means comprising the linear actuator of claim 2, and the draw bar being connected to the slider.

4. A boring device comprising:

a rotatable main shaft having a hollow portion in the direction along the axis line;

a main shaft driving means for rotating the main shaft about the axis line;

a tool holder connected to one end portion of the main shaft, the tool holder being capable of rotating with the main shaft and tilting relative to the axis line;

a tool supported by the tool holder;

a draw bar inserted in the hollow portion so as to be slidable in the direction along the axis line of the main shaft, the draw bar being connected to the tool holder, and tilting the tool holder by sliding; and a draw bar driving means for sliding the draw bar in the direction along the axis line, the draw bar driving means comprising the linear actuator of claim 1, and the draw bar being connected to the slider.

* * * * *